United States Patent
Kim et al.

(10) Patent No.: US 10,461,881 B2
(45) Date of Patent: Oct. 29, 2019

(54) METHOD AND SYSTEM FOR ASSIGNING MODULATION FORMAT IN OPTICAL NETWORKS

(71) Applicant: Fujitsu Limited, Kawasaki-shi, Kanagawa (JP)

(72) Inventors: Inwoong Kim, Allen, TX (US); Xi Wang, Murphy, TX (US); Olga Vassilieva, Plano, TX (US); Paparao Palacharla, Richardson, TX (US); Tadashi Ikeuchi, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 16/154,503

(22) Filed: Oct. 8, 2018

(65) Prior Publication Data

US 2019/0097747 A1   Mar. 28, 2019

Related U.S. Application Data

(63) Continuation-in-part of application No. 15/714,420, filed on Sep. 25, 2017.

(51) Int. Cl.
*H04J 14/02* (2006.01)

(52) U.S. Cl.
CPC ........ *H04J 14/0257* (2013.01); *H04J 14/026* (2013.01); *H04J 14/0267* (2013.01); *H04J 14/0278* (2013.01)

(58) Field of Classification Search
CPC .................................................. H04J 14/0267
See application file for complete search history.

(56) References Cited

U.S. PATENT DOCUMENTS 3,352,368 A   11/1967   Maffey, Jr.
4,459,522 A    7/1984   Huber
(Continued)

FOREIGN PATENT DOCUMENTS

WO   2013/048776   4/2013

OTHER PUBLICATIONS

Vassilieva, Olga, et al. "Interplay between PDL and nonlinear effects in coherent polarization multiplexed systems." *Optics express* 19.26 (2011): B357-B362; 6 pages.
(Continued)

*Primary Examiner* — Nathan M Cors
(74) *Attorney, Agent, or Firm* — Baker Botts L.L.P.

(57) ABSTRACT

Systems and methods for identifying a pair of nodes of a plurality of nodes of a virtual optical network (VON); identifying i) an optical route between the pair of nodes and ii) a desired availability of the optical route; determining a probability density function (PDF) of a signal-to-noise ratio (SNR) of a signal of the optical route; determining a SNR threshold such that an integration of the PDF of the SNR of the signal above the SNR threshold corresponds to the desired availability of the optical route; determining a plurality of spectral efficiencies that corresponds to the SNR threshold, each spectral efficiency of the plurality of spectral efficiencies associated with a respective modulation format of a plurality of modulation formats; and identifying a particular modulation format of the plurality of modulation formats that corresponds to a maximum spectral efficiency of the plurality of spectral efficiencies.

16 Claims, 11 Drawing Sheets

(56) References Cited

U.S. PATENT DOCUMENTS

| | | | |
|---|---|---|---|
| 4,543,515 | A | 9/1985 | Suzuki |
| 2003/0169998 | A1 | 9/2003 | Premaratne et al. |
| 2004/0092281 | A1 | 5/2004 | Burchfiel |
| 2004/0213565 | A1 | 10/2004 | Kamalov et al. |
| 2013/0119915 | A1 | 5/2013 | Pusateri et al. |
| 2013/0209093 | A1* | 8/2013 | Tanimura ........... H04B 10/0775 398/32 |
| 2014/0341572 | A1* | 11/2014 | Sambo ................ H04J 14/0257 398/48 |
| 2015/0369631 | A1 | 12/2015 | Cheung et al. |
| 2017/0310392 | A1* | 10/2017 | Boertjes ........... H04B 10/07953 |

OTHER PUBLICATIONS

Kim, Inwoong, et al. "SNR—availability based Network Provisioning." IEEE; 4 pages, 2018.

Fehenberger, Tobias, et al. "Sensitivity gains by mismatched probabilistic shaping for optical communication systems." *IEEE Photonics Technology Letters* 28.7 (2015): 786-789; 4 pages.

Bouda, Martin, et al. "Accurate prediction of quality of transmission with dynamically configurable optical impairment model." *Optical Fiber Communications Conference and Exhibition (OFC)*, 2017. IEEE, 2017; 3 pages.

Yan, Li, Erik Agrell, and Henk Wymeersch. "Sensitivity comparison of time domain hybrid modulation and rate adaptive coding." *Optical Fiber Communications Conference and Exhibition (OFC)*, 2016. IEEE, 2016; 3 pages.

ITU-T Series G, Supplement 39: Optical system design and engineering considerations; Feb. 2016; https://www.itu.in/rec/T-REC-G.Sup39-201602-I; <retrieved from the internet Oct. 22, 2018>. (Year: 2016); 125 pages.

Kong, Jian, et al. "Availability-guaranteed virtual optical network mapping with shared backup path protection." Global Communications Conference (GLOBECOM), 2016 IEEE. IEEE, 2016; 6 pages.

Antony, Tony, et al. "WDM Network Design." Retrieved from <http://www.ciscopress.com/articles/article.asp?p=30886&seqNum=5>, Feb. 7, 2003; 4 pages.

Chakma, Trimita "Optical Signal to Noise Ratio (OSNR)." International University Bremen, 2005; 18 pages.

* cited by examiner

METHOD AND SYSTEM FOR ASSIGNING MODULATION FORMAT IN OPTICAL NETWORKS

CROSS-REFERENCE TO RELATED APPLICATIONS

This application is a continuation-in-part of U.S. patent application Ser. No. 15/714,220, filed on Sep. 25, 2017, the disclosure of which is expressly incorporated herein by reference in its entirety.

FIELD OF THE DISCLOSURE

The present disclosure relates generally to optical communication networks and, more particularly, to assigning a modulation format in optical networks.

DESCRIPTION OF THE RELATED ART

Telecommunications systems, cable television systems and data communication networks use optical networks to rapidly convey large amounts of information between remote points. In an optical network, information is conveyed in the form of optical signals through optical fibers. Optical networks may also include various optical nodes which may contain various components such as amplifiers, dispersion compensators, multiplexer/demultiplexer filters, wavelength selective switches, couplers, etc. to perform various operations within the network.

Optical network virtualizations enable network service providers to provision multiple coexisting and isolated virtual optical networks (VONs) over the same physical infrastructure. For example, in conventional optical networks, network services are provided in terms of lightpaths (i.e., optical network paths between given endpoints). When provisioning VONs in response to a request, different mapping patterns for mapping a virtual node to physical topology may be possible.

SUMMARY

Innovative aspects of the subject matter described in this specification may be embodied in methods that include the actions of identifying a pair of nodes of a plurality of nodes of a virtual optical network (VON); identifying an optical route between the pair of nodes and a desired availability of the optical route; determining a probability density function (PDF) of a signal-to-noise ratio (SNR) of a signal of the optical route; determining a SNR threshold such that an integration of the PDF of the SNR of the signal above the SNR threshold corresponds to the desired availability of the optical route; determining a plurality of spectral efficiencies that corresponds to the SNR threshold, each spectral efficiency of the plurality of spectral efficiencies associated with a respective modulation format of a plurality of modulation formats; identifying a particular modulation format of the plurality of modulation formats that corresponds to a maximum spectral efficiency of the plurality of spectral efficiencies; assigning the particular modulation format to the virtual optical network; and transmitting or receiving data over the virtual optical network using the particular modulation format or shaping factor.

Other embodiments of these aspects include corresponding systems, apparatus, and computer programs, configured to perform the actions of the methods, encoded on computer storage devices.

These and other embodiments may each optionally include one or more of the following features. For instance, identifying the particular modulation format includes identifying parameters of the particular modulation format. The parameters can include probabilistic shaping (PS) parameters or time-domain hybrid quadrature amplitude modulation (TDHQ) parameters. Determining a baud rate based on the maximum spectral efficiency. Identifying an additional desired availability of the optical route; determining an additional SNR threshold such than an integration of the PDF of the SNR of the signal above the additional SNR threshold corresponds to the additional desired availability of the optical route; determining an additional plurality of spectral efficiencies that corresponds to the additional SNR threshold, each additional spectral efficiency of the plurality of additional spectral efficiencies associated with a respective additional modulation format of the plurality of modulation formats; and identifying a particular additional modulation format of the plurality of modulation formats that corresponds to a maximum additional spectral efficiency of the plurality of additional spectral efficiencies. The integration of the PDF of the SNR of the signal above the additional SNR threshold is greater than the integration of the PDF of the SNR of the signal above the SNR threshold. The maximum additional spectral efficiency that corresponds to the particular additional modulation format is less than the maximum spectral efficiency that corresponds to the particular modulation format.

Identifying a second optical route between the pair of nodes, wherein the second optical route is associated with the desired availability; determining a second probability density function (PDF) of the signal-to-noise ratio (SNR) of the signal of the second optical route; determining a second SNR threshold such that an integration of the PDF of the SNR of the signal above the second SNR threshold corresponds to the desired availability of the second optical route; determining a second plurality of spectral efficiencies that corresponds to the second SNR threshold, each second spectral efficiency of the plurality of second spectral efficiencies associated with a respective second modulation format of the plurality of modulation formats; and identifying a particular second modulation format of the plurality of modulation formats that corresponds to a second maximum spectral efficiency of the plurality of second spectral efficiencies.

Particular implementations of the subject matter described in this specification can be implemented so as to realize one or more of the following advantages. For example, maximum spectral efficiency is achieved, and a desired availability of the optical network is obtained.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

For a more complete understanding of the present invention and its features and advantages, reference is now made to the following description, taken in conjunction with the accompanying drawings, in which.

DESCRIPTION OF THE EMBODIMENT(S)

This document describes methods, systems, and computer readable medium for assigning a modulation format in optical networks. Specifically, this document discusses network provisioning based on a signal-to-noise ratio (SNR) availability that enables provisioning of an optical network supporting a probabilistically shaped modulation format or a time domain hybrid quadrature amplitude modulation (TDHQ) to meet a desired availability with maximum data rate or spectral efficiency.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Figure 1:
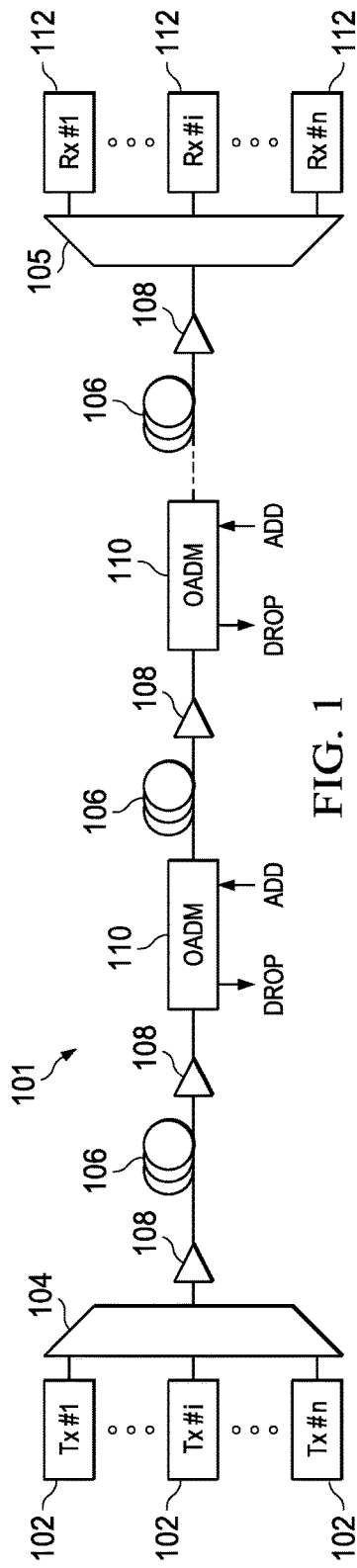
FIG. 1 is a block diagram of selected elements of an embodiment of an optical transport network.

Referring now to the drawings, FIG. 1 illustrates an example embodiment of optical transport network (OTN) 101, which may represent an optical communication system. Optical transport network 101 included one or more optical fibers 106 to transport one or more optical signals communicated by components of optical transport network 101. The network elements of optical transport network 101, coupled together by fibers 106, may comprise one or more transmitters (Tx) 102, one or more multiplexers (MUX) 104, one or more optical amplifiers 108, one or more optical add/drop multiplexers (OADM) 110, one or more demultiplexers (DEMUX) 105, and one or more receivers (Rx) 112.

Optical transport network 101 may comprise a point-to-point optical network with terminal nodes, a ring optical network, a mesh optical network, or any other suitable optical network or combination of optical networks. Optical transport network 101 may be used in a short-haul metropolitan network, a long-haul inter-city network, or any other suitable network or combination of networks. The capacity of optical transport network 101 may include, for example, 100 Gbit/s, 400 Gbit/s, or 1 Tbit/s. Optical fibers 106 comprise thin strands of glass capable of communicating the signals over long distances with very low loss. Optical fibers 106 may comprise a suitable type of fiber selected from a variety of different fibers for optical transmission. Optical fibers 106 may include any suitable type of fiber, such as a standard Single-Mode Fiber (SMF), Enhanced Large Effective Area Fiber (E-LEAF), or TrueWave® Reduced Slope (TW-RS) fiber, among others.

Optical transport network 101 may include devices to transmit optical signals over optical fibers 106. Information may be transmitted and received through optical transport network 101 by modulation of one or more wavelengths of light to encode the information on the wavelength. In optical networking, a wavelength of light may also be referred to as a "channel" that is included in an optical signal. Each channel may carry a certain amount of information through optical transport network 101.

To increase the information capacity and transport capabilities of optical transport network 101, multiple signals transmitted at multiple channels may be combined into a single wide bandwidth optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical transport network 101 may transmit disparate channels using WDM or some other suitable multi-channel multiplexing technique, and to amplify the multi-channel signal.

Recently, advancements in DWDM enabled combining several optical carriers to create a composite optical signal of a desired capacity. One such example of a multi-carrier optical signal is a superchannel, which is an example of high spectral efficiency (SE) that may attain transmission rates of 100 Gb/s, 400 Gb/s, 1 Tb/s, or higher. Thus, in a superchannel, subcarriers are tightly packed and consume less optical spectrum than in conventional DWDM. Another distinctive feature of superchannels is that the subcarriers in a superchannel travel from the same origin to the same destination and are not added or removed using an OADM while in transmission. Techniques for achieving high spectral efficiency (SE) in optical networks may include the use of superchannels modulated using dual-polarization quadrature phase-shift keying (DP-QPSK) for long-haul transmission at data rates of 100 Gb/s or greater. In particular embodiments, Nyquist wavelength-division multiplexing (N-WDM) may be used in a superchannel. In N-WDM, optical pulses having a nearly rectangular spectrum are packed together in the frequency domain with a bandwidth approaching the baud rate.

Optical transport network 101 may include one or more optical transmitters (Tx) 102 to transmit optical signals through optical transport network 101 in specific wavelengths or channels. Transmitters 102 may comprise a system, apparatus or device to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength and transmit the beam for carrying the signal throughout optical transport network 101. In some embodiments, optical transmitter 102 may be used to determine the baud rate for the data to be transmitted during the optical modulation. An example of transmitter 102 for applying different baud rates is an adaptive rate transponder. An example of transmitter 102 for applying different modulation formats is a universally programmable transceiver. Additionally, a forward error correction (FEC) module may be included in optical transmitter 102, or may be used in conjunction with optical transmitter 102. The FEC module may process the electrical signal carrying the information or data to be transmitted to include error correction codes. The FEC module at transmitter 102 may also determine a baud rate for sending the data to be transmitted to optical transmitter 102 for optical modulation.

Multiplexer 104 may be coupled to transmitters 102 and may be a system, apparatus or device to combine the signals transmitted by transmitters 102, e.g., at respective individual wavelengths, into a WDM signal.

Optical amplifiers 108 may amplify the multi-channeled signals within optical transport network 101. Optical amplifiers 108 may be positioned before and after certain lengths of fiber 106, which is referred to as "in-line amplification". Optical amplifiers 108 may comprise a system, apparatus, or device to amplify optical signals. For example, optical amplifiers 108 may comprise an optical repeater that amplifies the optical signal. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of a pump signal to excite the atoms of the doped portion of the optical fiber, which increases the intensity of the optical signal. As an example, optical amplifiers 108 may comprise an erbium-doped fiber amplifier (EDFA). However, any other suitable amplifier, such as a semiconductor optical amplifier (SOA), may be used.

OADMs 110 may be coupled to optical transport network 101 via fibers 106. OADMs 110 comprise an add/drop module, which may include a system, apparatus or device to add and drop optical signals (i.e., at individual wavelengths) from fibers 106. After passing through an OADM 110, an optical signal may travel along fibers 106 directly to a destination, or the signal may be passed through one or more additional OADMs 110 and optical amplifiers 108 before reaching a destination. In this manner, OADMs 110 may enable connection of different optical transport network topologies together, such as different rings and different linear spans.

In certain embodiments of optical transport network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) (not shown) that may be included in a ROADM.

Many existing optical networks are operated at 10 gigabit-per-second (Gbps) or 40 Gbps signal rates with 50 gigahertz (GHz) of channel spacing in accordance with International Telecommunications Union (ITU) standard wavelength grids, also known as fixed-grid spacing, which is compatible with conventional implementations of optical add-drop multiplexers (OADMs) and with conventional implementations of demultiplexers 105. However, as data rates increase to 100 Gbps and beyond, the wider spectrum requirements of such higher data rate signals often require increasing channel spacing. In traditional fixed grid networking systems supporting signals of different rates, the entire network system typically must be operated with the coarsest channel spacing (100 GHz, 200 GHz, etc.) that can accommodate the highest rate signals. This may lead to an over-provisioned channel spectrum for lower-rate signals and lower overall spectrum utilization.

Thus, in certain embodiments, optical transport network 101 may employ components compatible with flexible grid optical networking that enables specifying a particular frequency slot per channel. For example, each wavelength channel of a WDM transmission may be allocated using at least one frequency slot. Accordingly, one frequency slot may be assigned to a wavelength channel whose symbol rate is low, while a plurality of frequency slots may be assigned to a wavelength channel whose symbol rate is high. Thus, in optical transport network 101, ROADM 110 may be capable of adding or dropping individual or multiple wavelengths of a WDM, DWDM, or superchannel signal carrying data channels to be added or dropped in the optical domain. In certain embodiments, ROADM 110 may include or be coupled to a wavelength selective switch (WSS).

As shown in FIG. 1, optical transport network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical transport network 101 may transmit and carry a forty (40) channel DWDM signal. Demultiplexer 105 may divide the single, forty channel DWDM signal into forty separate signals according to the forty different channels. It will be understood that different numbers of channels or subcarriers may be transmitted and demultiplexed in optical transport network 101, in various embodiments.

In FIG. 1, optical transport network 101 may also include receivers 112 coupled to demultiplexer 105. Each receiver 112 may receive optical signals transmitted at a particular wavelength or channel, and may process the optical signals to obtain (demodulate) the information (data) that the optical signals contain. Accordingly, network 101 may include at least one receiver 112 for every channel of the network. As shown, receivers 112 may demodulate the optical signals according to a baud rate used by transmitter 102. In some embodiments, receiver 112 may include, or may be followed by, a forward error correction (FEC) module to use the error correction codes to check the integrity of the received data. The FEC module may also correct certain errors in the data based on the error correction codes. The FEC module at receiver 112 may also demodulate the data at a specific baud rate defined for each channel at transmitter 102, as described above.

Optical networks, such as optical transport network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

PSK and QAM signals may be represented using a complex plane with real and imaginary axes on a constellation diagram. The points on the constellation diagram representing symbols carrying information may be positioned with uniform angular spacing around the origin of the diagram. The number of symbols to be modulated using PSK and QAM may be increased and thus increase the information that can be carried. The number of signals may be given in multiples of two. As additional symbols are added, they may be arranged in uniform fashion around the origin. PSK signals may include such an arrangement in a circle on the constellation diagram, meaning that PSK signals have constant power for all symbols. QAM signals may have the same angular arrangement as that of PSK signals, but include different amplitude arrangements. QAM signals may have their symbols arranged around multiple circles, meaning that the QAM signals include different power for different symbols. This arrangement may decrease the risk of noise as the symbols are separated by as much distance as possible. A number of symbols "m" may thus be used and denoted "m-PSK" or "m-QAM."

Examples of PSK and QAM with a different number of symbols can include binary PSK (BPSK or 2-PSK) using two phases at 0° and 180° (or in radians, 0 and $\pi$) on the constellation diagram; or quadrature PSK (QPSK, 4-PSK, or 4-QAM) using four phases at 0°, 90°, 180°, and 270° (or in radians, 0, $\pi/2$, $\pi$, and $3\pi/2$). Phases in such signals may be offset. Each of 2-PSK and 4-PSK signals may be arranged on the constellation diagram. Certain m-PSK signals may also be polarized using techniques such as dual-polarization QPSK (DP-QPSK), wherein separate m-PSK signals are multiplexed by orthogonally polarizing the signals. Also, m-QAM signals may be polarized using techniques such as dual-polarization 16-QAM (DP-16-QAM), wherein separate m-QAM signals are multiplexed by orthogonally polarizing the signals.

Dual polarization technology, which may also be referred to as polarization division multiplexing (PDM), enables achieving a greater bit rate for information transmission. PDM transmission comprises simultaneously modulating information onto various polarization components of an optical signal associated with a channel, thereby nominally increasing the transmission rate by a factor of the number of polarization components. The polarization of an optical signal may refer to the direction of the oscillations of the optical signal. The term "polarization" may generally refer to the path traced out by the tip of the electric field vector at a point in space, which is perpendicular to the propagation direction of the optical signal.

In certain embodiments, optical transport network 101 may transmit a superchannel, in which a plurality of subcarriers (or subchannels or channels) are densely packed in a fixed bandwidth band and may be transmitted at very high data rates, such as 400 Gb/s, 1 Tb/s, or higher. Furthermore, the superchannel may be well suited for transmission over very long distances, such as hundreds of kilometers, for example. A typical superchannel may comprise a set of subcarriers that are frequency multiplexed to form a single channel that are transmitted through optical transport network 101 as one entity. The subcarriers within the superchannel may be tightly packed to achieve high spectral efficiency.

In an optical network, such as optical transport network 101 in FIG. 1, it is typical to refer to a management plane, a control plane, and a transport plane (sometimes called the physical layer). A central management host (see also FIG. 2) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, or an operational support system (OSS) which handles network-wide operations.

Modifications, additions or omissions may be made to optical transport network 101 without departing from the scope of the disclosure. For example, optical transport network 101 may include more or fewer elements than those depicted in FIG. 1. Also, as mentioned above, although depicted as a point-to-point network, optical transport network 101 may comprise any suitable network topology for transmitting optical signals such as a ring, a mesh, or a hierarchical network topology.

In operation, optical transport network 101 represents a certain transmission capacity for data. As the demand for transmission capacity continues to increase, various methods may be employed to accommodate greater transmission capacity on optical transport network 101. For example, advanced modulation formats, such as 16-QAM or 64-QAM, may be used to increase transmission capacity per wavelength channel. The advanced modulation formats may be applied using transmitter 102 and receiver 112. However, the use of advanced modulation formats may result in decreased transmission reach (also referred to simply as 'reach') of the optical signal. For example, the reach may be determined by an acceptable value for bit rate error (BER), and accordingly optical signal-to-noise ratio (OSNR), which may be observed at receivers 112.

One strategy for increasing transmission capacity is the use of a superchannel, in which a plurality of subcarrier signals are densely packed in a fixed bandwidth band and may be transmitted at very high data rates, such as 400 Gb/s, 1 Tb/s, or higher. As noted above, optical superchannels may represent a promising solution for transmission of signals at 400 Gb/s and 1 Tb/s data rate per channel. However, as noted above, superchannels are typically used with flexible grid network components, which may not be universally available. Also, administration of superchannels may be associated with additional layers of network management, which may be undesirable in certain networks. While the use of superchannels typically enables an increase in transmission capacity, the use of superchannels might not extend the transmission reach of optical signals using optical transport network 101.

As noted above, transmitter 102 may be a universally programmable transceiver for applying different modulation formats, while receiver 112 may include the corresponding functionality for demodulation. Thus, transmitter 102 may support the use of constellation shaping and may be selectively programmed to apply constellation shaping on a per channel basis, while receiver 112 may correspondingly demodulate channels to which a certain kind of constellation shaping has been applied. In various embodiments, transmitter 102 and receiver 112 may include respective mapping/de-mapping functionality, such as within a digital signal processing (DSP) module, to enable implementation of constellation shaping in optical transport network 101.

Figure 2:
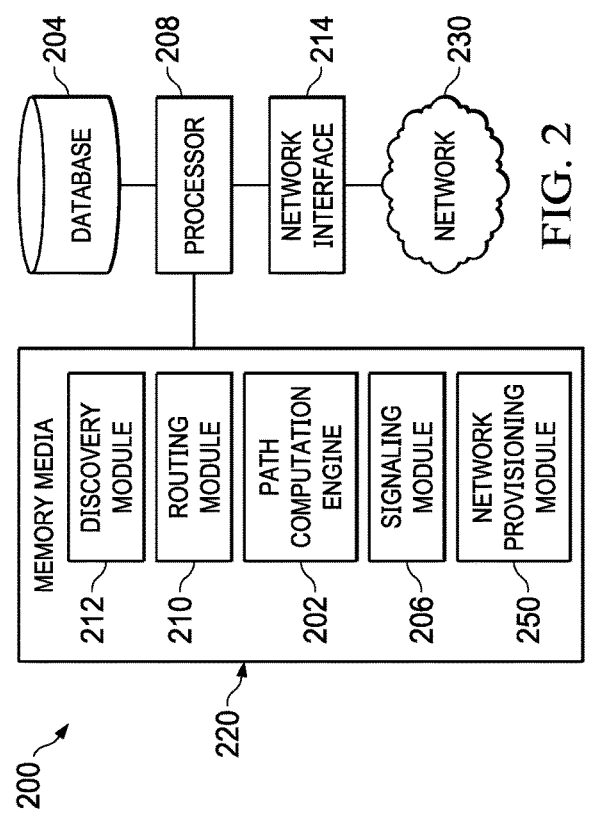
FIG. 2 is a block diagram of selected elements of an embodiment of network management system for implementing control plane functionality in optical networks.

Referring now to FIG. 2, a block diagram of selected elements of an embodiment of network management system 200 for implementing control plane functionality in optical networks, such as, for example, in optical transport network 101 (see FIG. 1), is illustrated. A control plane may include functionality for network intelligence and control and may comprise applications that support the ability to establish network services, including applications or modules for discovery, routing, path computation, and signaling, as will be described in further detail. The control plane applications executed by network management system 200 may work together to automatically establish services within the optical network. Discovery module 212 may discover local links connecting to neighbors. Routing module 210 may broadcast local link information to optical network nodes while populating database 204. When a request for service from the optical network is received, path computation engine 202 may be called to compute a network path using database 204. This network path may then be provided to signaling module 206 to establish the requested service.

As shown in FIG. 2, network management system 200 includes processor 208 and memory media 220, which may store executable instructions (i.e., executable code) that may be executable by processor 208, which has access to memory media 220. Processor 208 may execute instructions that cause network management system 200 to perform the functions and operations described herein. For the purposes of this disclosure, memory media 220 may include non-transitory computer-readable media that stores data and instructions for at least a period of time. Memory media 220 may comprise persistent and volatile media, fixed and removable media, and magnetic and semiconductor media. Memory media 220 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and flash memory; non-transitory media, or various combinations of the foregoing. Memory media 220 is operable to store instructions, data, or both. Memory media 220 as shown includes sets or sequences of instructions that may represent executable computer programs, namely, path computation engine 202, signaling module 206, discovery module 212, routing module 210, and a network provisioning module 250.

Also shown included with network management system 200 in FIG. 2 is network interface 214, which may be a suitable system, apparatus, or device operable to serve as an interface between processor 208 and network 230. Network interface 214 may enable network management system 200 to communicate over network 230 using a suitable transmission protocol or standard. In some embodiments, network interface 214 may be communicatively coupled via network 230 to a network storage resource. In some embodiments, network 230 represents at least certain portions of optical transport network 101. In certain embodiments, network 230 may include at least certain portions of a public network, such as the Internet. Network 230 may be implemented using hardware, software, or various combinations thereof.

In certain embodiments, the control plane may be configured to interface with a person (i.e., a user) and receive data about the signal transmission path. For example, the control plane may also include and/or may be coupled to one or more input devices or output devices to facilitate receiving data about the signal transmission path from the user and outputting results to the user. The one or more input and output devices (not shown) may include, but are not limited to, a keyboard, a mouse, a touchpad, a microphone, a display, a touchscreen display, an audio speaker, or the like. Alternately or additionally, the control plane may be configured to receive data about the signal transmission path from a device such as another computing device or a network element (not shown in FIG. 2), for example via network 230.

As shown in FIG. 2, in some embodiments, discovery module 212 may be configured to receive data concerning an optical signal transmission path in an optical network and may be responsible for discovery of neighbors and links between neighbors. In other words, discovery module 212 may send discovery messages according to a discovery protocol, and may receive data about the optical signal transmission path. In some embodiments, discovery module 212 may determine features, such as, but not limited to: fiber type, fiber length, number and type of components, data rate, modulation format of the data, input power of the optical signal, number of signal carrying wavelengths (i.e., channels), channel spacing, traffic demand, and network topology, among others.

As shown in FIG. 2, routing module 210 may be responsible for propagating link connectivity information to various nodes within an optical network, such as optical transport network 101. In particular embodiments, routing module 210 may populate database 204 with resource information to support traffic engineering, which may include link bandwidth availability. Accordingly, database 204 may be populated by routing module 210 with information usable to determine a network topology of an optical network.

Path computation engine 202 may be configured to use the information provided by routing module 210 to database 204 to determine transmission characteristics of the optical signal transmission path. The transmission characteristics of the optical signal transmission path may provide insight on how transmission degradation factors, such as chromatic dispersion (CD), nonlinear (NL) effects, polarization effects, such as polarization mode dispersion (PMD) and polarization dependent loss (PDL), and amplified spontaneous emission (ASE), among others, may affect optical signals within the optical signal transmission path. To determine the transmission characteristics of the optical signal transmission path, path computation engine 202 may consider the interplay between the transmission degradation factors. In various embodiments, path computation engine 202 may generate values for specific transmission degradation factors.

Path computation engine 202 may further store data describing the optical signal transmission path in database 204.

In some embodiments, database 204 may be populated with information indicating a respective reach (and/or an achievable reach extension) and a respective spectral efficiency for WDM channels at particular wavelengths and with particular combinations of modulation formats, symbol rates, and numbers of subcarriers, with and without probabilistic constellation shaping of particular types. In some embodiments, network management system 200 may be configured to determine, based on the information in the database, particular combinations of these parameters that can result in a given shorter wavelength channel achieving a target reach selected for all WDM channels in an optical transport network.

In FIG. 2, signaling module 206 may provide functionality associated with setting up, modifying, and tearing down end-to-end networks services in optical transport network 101. For example, when an ingress node in the optical network receives a service request, the control plane may employ signaling module 206 to request a network path from path computation engine 202 that may be optimized according to different criteria, such as bandwidth, cost, etc. When the desired network path is identified, signaling module 206 may then communicate with respective nodes along the network path to establish the requested network services. In different embodiments, signaling module 206 may employ a signaling protocol to propagate subsequent communication to and from nodes along the network path.

In operation of network management system 200, after an optical channel has been provisioned, network management system 200 may configure the optical channel to increase the transmission reach of the optical channel. In some embodiments, path computation engine 202, or another element of network management system 200, may be operable to select, within the optical transmission system, a specific modulation format and a specific number of subcarriers to achieve the highest spectral efficiency and the longest reach for the optical channel. Selection of the number of subcarriers for the optical channel may be dependent on the optical fiber type, the selected modulation format, and the delivered reach extension, among other considerations.

In operation of network management system 200, path computation engine 202, or another entity or module, may provide path information associated with a given optical path, such as a distance, a number and type of optical channels to be transmitted, a fiber type, and a dispersion map. For example, signaling module 206, or another entity or module, may receive the path information and may decide on a type of modulation format and whether or not to use constellation shaping for any of the optical channels transmitted over the optical path. In order to activate or deactivate constellation shaping, signaling module 206 may send a first command to each transmitter for each of the optical channels, respectively. Then, signaling module 206 may send a second command to each receiver corresponding to each transmitter to activate or deactivate constellation shaping. Transmitters and receivers having universal programmable transponder functionality may receive the commands from signaling module 206 and may then activate or deactivate transmission of the optical channels using constellation shaping.

Throughout this disclosure, a hyphenated form of a reference numeral refers to a specific instance of an element and the un-hyphenated form of the reference numeral refers to the element generically or collectively. Thus, as an example (not shown in the drawings), widget "12-1" refers to an instance of a widget class, which may be referred to collectively as widgets "12" and any one of which may be referred to generically as a widget "12". In the figures and the description, like numerals are intended to represent like elements.

Figure 3:
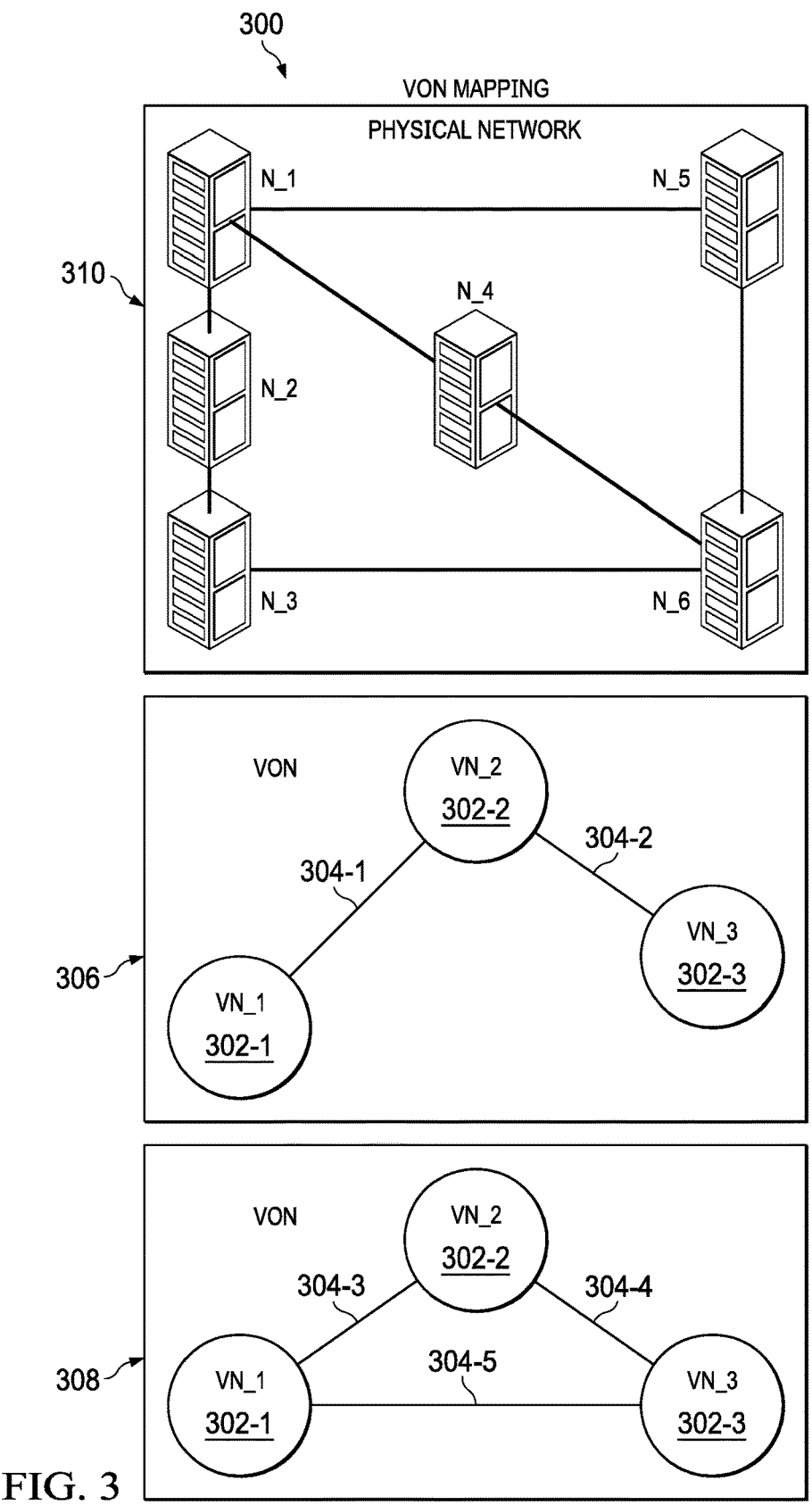
FIG. 3 is a depiction of a virtual optical network mapping to a physical network.

FIG. 3 illustrates an example of a virtual optical network (VON) mapping 300 of a VON 306 to a physical network 310. FIG. 3 is an example depicted for descriptive purposes. It will be understood that VON mappings, as disclosed herein, may be implemented for different sizes and complexities of both VONs and physical networks. In VON mapping 300, physical network 310 is shown comprising six physical nodes, N_1, N_2, N_3, N_4, N_5, and N_6. Additionally, physical network 310 includes links between individual nodes that represent an actual physical network topology. In different implementations, physical nodes in physical network 310 may represent certain network infrastructure, such as data centers or other information technology (IT) infrastructure that relies upon the physical links for communication between the physical nodes. Furthermore, physical network 310 may correspond to a particular physical area, such as a metropolis, a region, a county, a state, or other areas.

In FIG. 3, VON 306 may represent a virtual optical network that is provided to a customer as a telecommunications service. Accordingly, VON 306 may represent a combination of network products and network services provided to a customer by a network provider, such as a network provider associated with physical network 310. As shown, VON 306 comprises three virtual nodes (VN) 302, namely VN_1 302-1, VN_2 302-2, and VN_3 302-3, as well as virtual link 304-1 between VN_1 302-1 and VN_2 302-2, and virtual link 104-2 between 302-2 and VN_3 302-3.

In FIG. 3, VON 308 may represent another virtual optical network that is provided to a customer as a telecommunications service. Accordingly, VON 308 may represent a combination of network products and network services provided to a customer by a network provider, such as a network provider associated with physical network 310. As shown, VON 308 comprises three virtual nodes VN_1 302-1, VN_2 302-2, and VN_3 302-3, as well as virtual link 304-3 between VN_1 302-1 and VN_2 302-2, virtual link 304-4 between 302-2 and VN_3 302-3, and virtual link 304-5 between VN_1 302-1 and VN_3 302-3.

In order to facilitate VON mapping 300, a VON may be selected based on requested features of the telecommunication service, such as between VON 306 and VON 308. Then, each of the virtual nodes 302 in the selected VON may be mapped to one of the physical nodes in physical network 310, while virtual links 304 may represent physical links (and certain physical nodes) between the mapped physical nodes. Depending on the topologies used for VON mapping 300, virtual node 302 may be selected from one or more of the physical nodes. In other words, virtual node 302 may be associated with at least one candidate physical node for VON mapping 300 (see also FIG. 5).

In operation, optical transport network 101 in FIG. 1 may be used to implement physical network 310 shown in FIG. 3. Accordingly, certain nodes included with optical transport network 101 may represent physical nodes that can be mapped to virtual nodes 302 of a desired VON, such as VON 306 or 308 as shown in VON mapping 300, or any in other desired VON mapping for a customer. A customer that is provided VON mapping 300 may also be provided with a choice of different levels of network service, such as different levels of quality of service (QoS) associated with VON 306. One aspect of QoS for a customer of VON 306 may be a so-called "availability" or a of each virtual link in VON 306. The availability a for a physical link is given by Equation 1:

$$a = \frac{MTTF}{MTTF + MTTR} \qquad \text{Equation 1}$$

In Equation 1, MTTF is a mean time to failure for the physical link, and MTTR is a mean time to repair for the physical link.

For example, considering VON 308, the total availability of a network comprising three physical links A, B, and C (corresponding to virtual links 304-3, 304-4, and 304-5 in VON 308), the aggregate availability of the network $a_N$ (e.g. VON 308) is simply the product of the individual link availabilities, $a_A$, $a_B$, $a_C$, as given by Equation 2.

$$a_N = a_A a_B a_C \qquad \text{Equation 2}$$

As noted, Equation 2 assumes that all physical links should be available. If one physical link in the same network is allowed to fail, the aggregate availability of the network $a_N$ is given by Equation 3.

$$a_N = a_A a_B a_C + (1-a_A)a_B a_C + a_A(1-a_B)a_C + a_A a_B(1-a_C) \qquad \text{Equation 3}$$

Thus, availability of a VON may be an important aspect of QoS for the VON service being provided. Additional aspects of QoS may include error rates and transmission throughput rates (baud rates), which may represent additional or higher levels of network service. Conventional methods of VON mapping may assign large amounts of network resources to meet a QoS criteria, and in particular, may consume large amounts of the available optical spectrum for this purpose. However, availability of the VON may be a primary aspect that is valuable for a customer that uses VON services from a provider.

Additional performance metrics (or quality metrics) associated with a physical link, such as an optical path, may include optical signal-to-noise ratio (OSNR) and quality factor (Q-factor or Q). For a WDM signal having a linear optical signal power S and a linear optical noise power $N_{Bo}$ in a given optical bandwidth (Bo~12.48 GHz), the OSNR is given in decibels by Equation 4.

$$OSNR[\text{dB}] = 10\log_{10}\left(\frac{S}{N_{Bo}}\right) \qquad \text{Equation 4}$$

Using Equation 4, OSNR may be accordingly measured for a given optical network, or more specifically, for a given optical path. The SNR in decibels may be calculated in decibels from OSNR using Equation 5.

$$SNR[\text{dB}] = OSNR + 10\log_{10}\left(\frac{B_O}{B_C}\right) \qquad \text{Equation 5}$$

In Equation 5, $B_O$ is an optical bandwidth of 12.48 GHz while $B_C$ is an electrical bandwidth of the received signal or baud rate. If SNR is known, a BER can be calculated depending on a modulation format. For example, the BER of DP-QPSK and DP-16QAM can be found using the following Equations 6 and 7, respectively.

$$BER_{DP\text{-}QPSK} = 0.5\ \text{erfc}(\sqrt{SNR/2}) \qquad \text{Equation 6}$$

$$BER_{DP\text{-}16QAM} = 3/8\ \text{erfc}(\sqrt{SNR/10}) \qquad \text{Equation 7}$$

In equations 6 and 7, SNR is in linear scale and erfc is the complementary error function. Then, BER may be converted to Q-factor using the following Equation 8.

$$Q\ \text{factor [dB]} = 20\log_{10}(\sqrt{2}\ \text{erfc}^{-1}(2\ BER)) \qquad \text{Equation 8}$$

Because the Q-factor is dependent upon the modulation format and the baud rate, the Q-factor is dependent upon a wavelength configuration of the optical signal. However, with knowledge of the bandwidths $B_O$ and $B_C$, which can be ascertained from the wavelength configuration, OSNR may be calculated from Q and vice-versa, as given by Equations 4-8. It is noted that OSNR is not dependent on modulation format and may be calculated for an optical path using an analytical model such as the Gaussian noise (GN) model. As used herein, "wavelength configuration" refers to characteristics of the optical signal that can be selected for transmission and may comprise at least one of a modulation format, a forward error correction (FEC) ratio, a baud rate, and a launch optical power of the optical signal transmitted over an optical path.

Furthermore, the process of selecting a desired or optimal wavelength configuration from possible wavelength configurations for a given VON may further utilize a cost function for weighting certain factors or aspects, such as in order to satisfy a particular goal or priority for operating optical transport network 101, or portions thereof. The cost function may be based on some metric associated with the given VON related to optical network performance, such as spectral efficiency, data rate, number of spectral slots, or network resource consumption, among other possible metrics.

In one example application of the cost function, data rates for virtual links 304-3, 304-4, and 304-5 in VON 308, may be used. Table 1 shows values for two cases of availability for VON 308, where virtual links 304-3, 304-4, and 304-5 in VON 308 are noted as A, B, and C, respectively. Case 1 may represent a first wavelength configuration, while case 2 may represent a second wavelength configuration. In this example, VON 308 is considered as failing when at least 2 virtual links fail at the same time, while VON availability in Table 1 is calculated using Equation 3. For example, if a threshold for VON availability is 0.999, then both case 1 and case 2 satisfy this threshold.

TABLE 1

| Two cases of data rate for a cost function using VON 308 | | |
|---|---|---|
| Parameter | Case 1 | Case 2 |
| $a_A$ | 0.99999 | 0.99999 |
| $a_B$ | 0.99999 | 0.99999 |
| $a_C$ | 0.30000 | 0.99999 |
| $R_A$ | 200 Gb/s | 200 Gb/s |
| $R_B$ | 200 Gb/s | 200 Gb/s |
| $R_C$ | 400 Gb/s | 200 Gb/s |
| VON availability | 0.99986 | 1.000 |
| Aggregate Data Rate (ADR) | 800 Gb/s | 600 Gb/s |
| Time Averaged ADR (TAADR) | 519.96 Gb/s | 599.94 Gb/s |

In Table 1, $R_i$ is a data rate for a virtual link i, while $ADR = \Sigma_i R_i$, and $TAADR = \Sigma_i a_i R_i$. Table 1 shows that the wavelength configuration in case 1 has a higher ADR, but a lower TAADR. Thus, the second wavelength configuration may be selected when, for example, TAADR is the metric used for the cost function to weight the different possible wavelength configurations. TAADR is a metric indicating an actual throughput of a VON for a normalized period of time.

In another example, a spectral efficiency (SE) may be used as the metric for the cost function for virtual links 304-3, 304-4, and 304-5 in VON 308, noted as A, B, and C, respectively. Table 2 shows values for two cases of availability for VON 308, similar to the values shown in Table 1.

TABLE 2

Two cases of spectral efficiency for a cost function using VON 308

| Parameter | Case 1 | Case 2 |
|---|---|---|
| $a_A$ | 0.99999 | 0.99999 |
| $a_B$ | 0.99999 | 0.99999 |
| $a_C$ | 0.30000 | 0.99999 |
| $SE_A$ | 8 bit/s/Hz | 8 bit/s/Hz |
| $SE_B$ | 8 bit/s/Hz | 8 bit/s/Hz |
| $SE_C$ | 16 bit/s/Hz | 8 bit/s/Hz |
| VON availability | 0.99986 | 1.000 |
| Average Spectral Efficiency (ASE) | 10.667 bit/s/Hz | 8 bit/s/Hz |
| Time Averaged SE (TASE) | 6.9328 bit/s/Hz | 7.9992 bit/s/Hz |

In Table 2, $SE_i$ is a spectral efficiency for a virtual link i, while $$ASE = \sum_i \frac{R_i}{N}, \text{ and } TASE = \sum_i a_i \frac{SE_i}{N},$$

where N is the number of virtual links. Table 2 shows that the wavelength configuration in case 1 has a higher SE, but a lower TASE. Thus, the wavelength configuration in case 2 may be selected when, for example, TASE is the metric used for the cost function to weight the different possible wavelength configurations. In addition to the examples of data rate and spectral efficiency as metrics used for the cost function, other metrics such as a number spectral slots to support a given data rate may be used in different implementations.

As will be disclosed in further detail herein, VON mapping of physical network resources may be provided with guaranteed availability of the virtual links in the VON. The VON service with guaranteed availability disclosed herein may enable a VON mapping based on estimated performance metrics, such as Q-factor and OSNR, of the physical links for mapping to the virtual links. The VON service with guaranteed availability disclosed herein may enable a VON mapping based on monitoring of performance metrics, such as Q-factor and OSNR, for an optical path that comprises a physical link for mapping to a virtual link. In this manner, the VON service with guaranteed availability disclosed herein may enable optimization of network performance and network resource utilization, such as spectrum utilization.

The VON service with guaranteed availability disclosed herein may identify sets of source-destination virtual nodes for VON mapping. Then, for each source-destination virtual node pair defining a virtual link, candidate optical paths in the physical network may be identified for VON mapping. Then, for each optical path in the physical network, a probability density function (PDF) of Q may be determined. The PDF comprises a probability function (e.g. a histogram) for different individual values of Q that are observed. The PDF of Q may be determined based on empirical monitoring of the optical path when actual traffic is transmitted over the optical path. In some instances, the PDF of Q may be determined based on an analytical model of traffic being transmitted over the optical path, such as a Monte Carlo simulation model. From the PDF of Q, the availability a of the optical path may be determined.

From the PDF of Q for the optical path, which is dependent on the wavelength configuration of the optical path, a PDF of OSNR for the optical path may be calculated, which is not dependent on the wavelength configuration of the optical path. Then, various different potential wavelength configurations of the optical path may be evaluated, including calculating a respective availability for each of the wavelength configurations of the optical path. Then, based on the values of the availability for the wavelength configurations of the optical path, one of the wavelength configurations may be selected, for example, based on a desired availability, among other factors such as spectral efficiency, spectral slot position, and number of physical links. Additionally, a cost function for a desired metric of the wavelength configuration may be used as a weighting to promote or favor a particular goal of network operation related to the metric, such as data rate or spectral efficiency, among other metrics.

The selected wavelength configuration for the optical path may then be implemented for the optical path to enable VON service based on the VON mapping. The implementation of the wavelength configuration may comprise sending instructions to transmitter 102 and receiver 112 for the optical path. In various implementations, transmitter 102 and receiver 112 are universal transponders that can be programmed for different wavelength configurations. In this manner, a finer granularity of spectral efficiency and availability for each virtual link in the VON may be achieved, as compared to conventional methods, such as using a fixed receiver margin of about 2 dB as described above.

Figure 4:
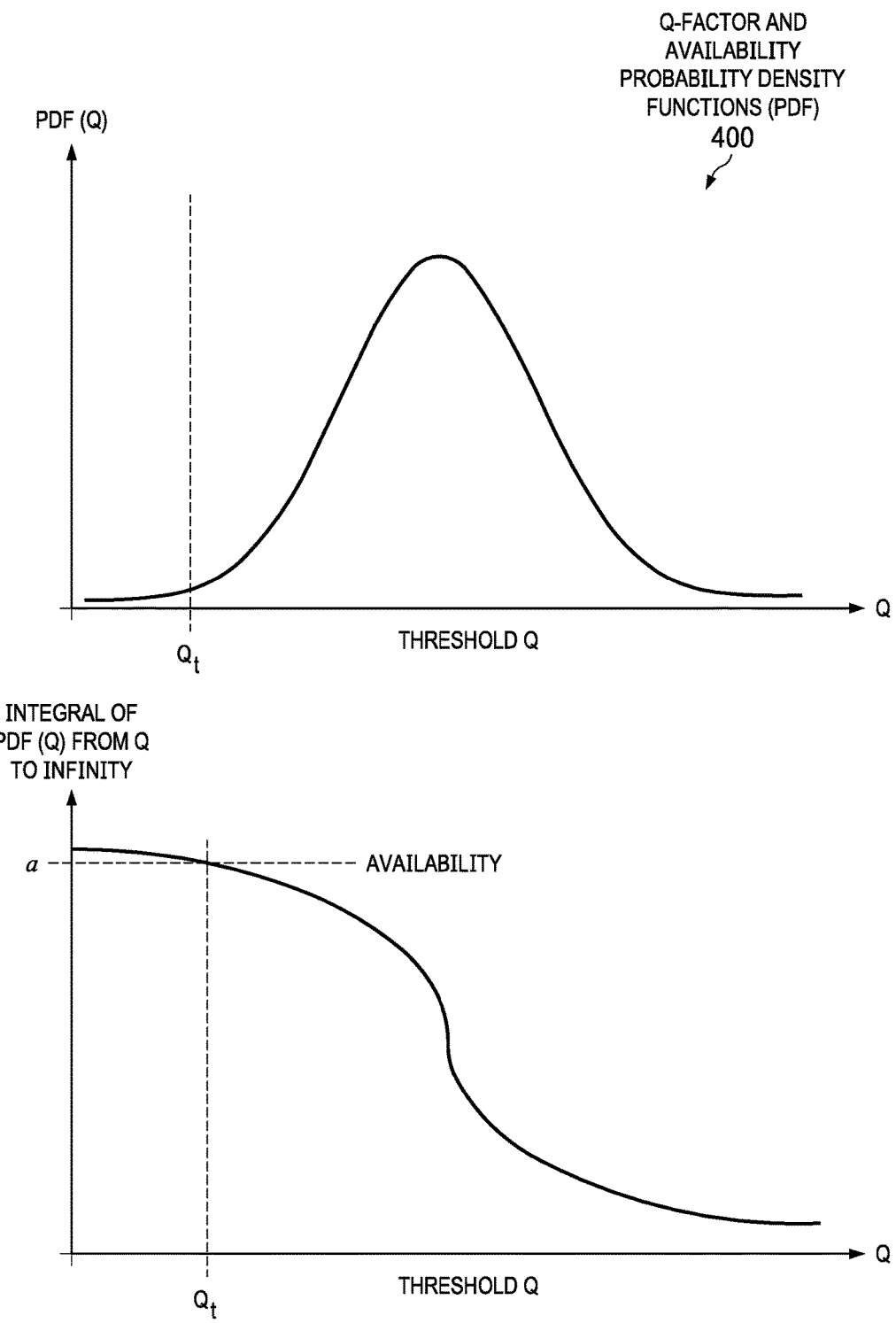
FIG. 4 depicts plots of Q-factor and availability probability density functions (PDF).

FIG. 4 depicts plots of a probability density function (PDF) of Q-factor 400. The PDF of Q-factor for a given optical path may be obtained by monitoring the performance of existing optical traffic. If there is no existing traffic, then the PDF of OSNR can be generated by stochastic simulation based on an analytical model (for example the Gaussian Noise model) for the optical transmission system. Then, the PDF of OSNR can be converted to the PDF of Q-factor depending on a modulation format. In FIG. 4, the top plot shows PDF(Q) versus Q and results in a distribution function, such as a Gaussian function or similar distribution function. In the PDF(Q) plot, a threshold Q ($Q_t$) value is shown and represent a minimum value of Q, which guarantees error free operation with forward error correction (FEC). It is noted that $Q_t$ is determined by an FEC overhead ratio and coding. The probability of error free operation for this particular PDF of Q-factor can be calculated by integrating the area of PDF above $Q_t$, which represents a certain level of quality of service for a given optical path.

In the lower plot of FIG. 4, the integral of PDF(Q) from Q to infinity is shown versus Q. Also shown in the lower plot is a marker at $Q_t$, from which the availability a can be calculated from the integral as given by Equation 9.

$$a = \int_{Q_t}^{\infty} PDF(Q) dQ \quad \text{Equation 9}$$

Accordingly, when the PDF(Q) for an optical path having a given wavelength configuration can be determined, the availability a for the optical path for the given wavelength configuration can be calculated. Conversely, given a desired availability a, a corresponding candidate wavelength configuration (modulation format, baud rate, FEC ratio, etc.) may be determined by evaluating availability based on integration of PDF(Q) over Q. Furthermore, it is noted that the PDF of OSNR may be calculated from the PDF(Q) using Equation 5, which corresponds to a particular wavelength configuration of the optical path. Then, from the PDF of OSNR for the optical path, a PDF(Q), and correspondingly availability a, can be calculated for any desired wavelength configuration, for example, in order to evaluate different wavelength configurations, as shown below in FIG. 5.

Figure 5:
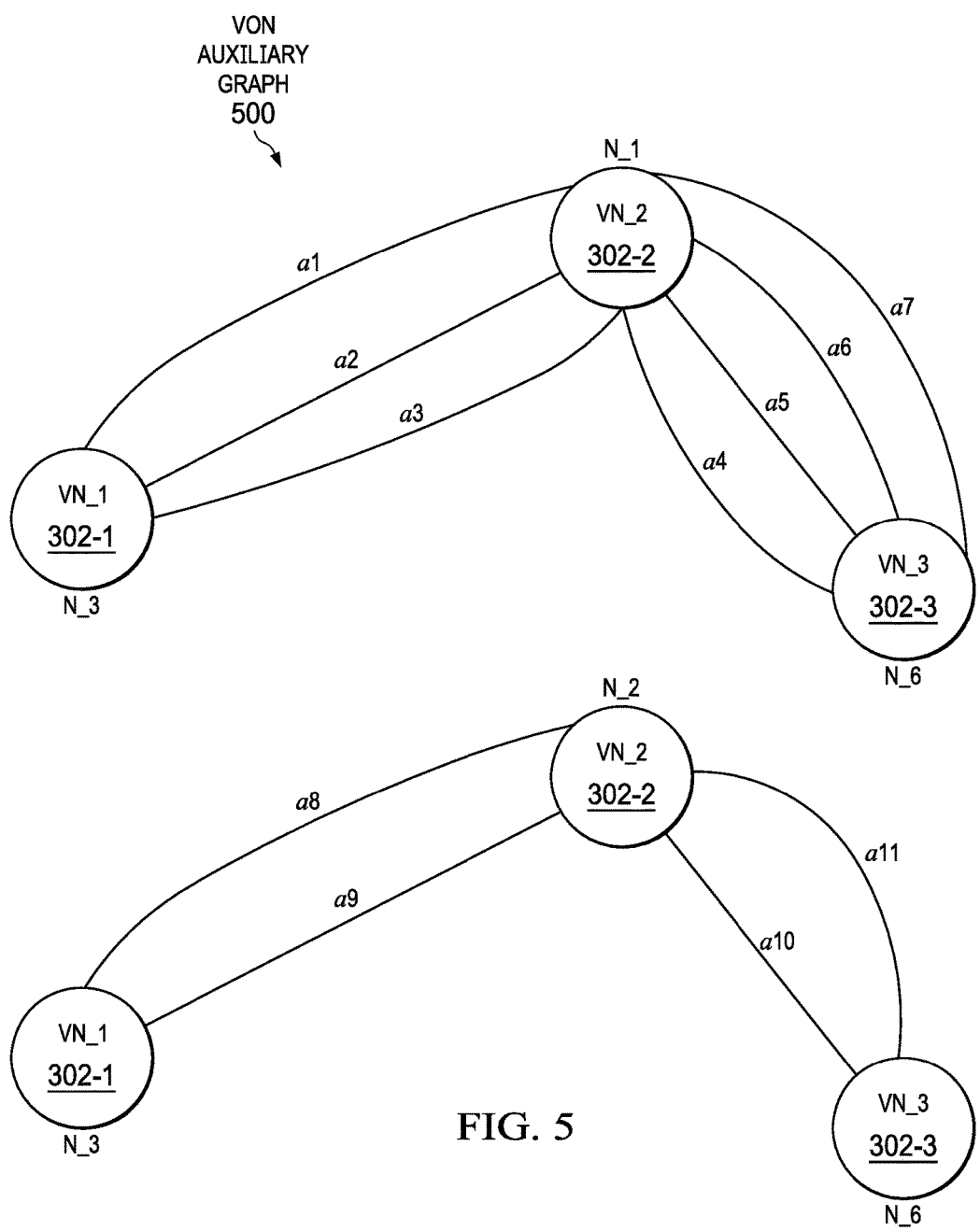
FIG. 5 is a depiction of selected elements of an implementation of a virtual optical network auxiliary graph.

Referring now to FIG. 5, selected elements of an implementation of a VON auxiliary graph 500 is depicted. VON auxiliary graph 500 in FIG. 5 is based on VON mapping 300 in FIG. 3. In any given VON mapping, there might be multiple physical node candidates for a virtual node, and there might be multiple physical link or route candidates for each virtual path between virtual node pairs. To create a VON auxiliary graph, potential sets of virtual nodes and virtual links are first identified. Then for each source-destination node pair in the sets of virtual nodes, potential physical links between physical nodes are determined.

As shown in FIG. 5, VON auxiliary graph 500 is based on VON mapping 300. Specifically, two cases of mapping are identified for VON 306 in FIG. 5 using physical network 310, as shown in Table 3.

TABLE 3

Two cases of VON mapping in VON auxiliary graph 500

| VIRTUAL NODE | PHYSICAL NODE CASE 1 | PHYSICAL NODE CASE 2 |
| --- | --- | --- |
| VN_1 302-1 | N_3 | N_3 |
| VN_2 302-2 | N_1 | N_2 |
| VN_3 302-3 | N_6 | N_6 |

The two cases of VON mapping are shown as two separate auxiliary graphs in FIG. 5: the top auxiliary graph corresponds to case 1 in Table 3, while the bottom auxiliary graph corresponds to case 2 in Table 3. In VON auxiliary graph 500, different wavelength configurations have been evaluated and a corresponding value of availability a has been determined. In the top auxiliary graph in FIG. 5, three different wavelength configurations corresponding to availabilities a1, a2, a3 are shown as potential virtual links for virtual link 304-1, while four different wavelength configurations corresponding to availabilities a4, a5, a6, a7 are shown as potential virtual links for virtual link 304-2. In the bottom auxiliary graph in FIG. 5, two different wavelength configurations corresponding to availabilities a8, a9 are shown as potential virtual links for virtual link 304-1, while two different wavelength configurations corresponding to availabilities a10, a11 are shown as potential virtual links for virtual link 304-2.

At this point, each potential virtual link in VON auxiliary graph 500 is associated with a value for availability a. The potential virtual links may then be evaluated for selection based on the availability a as well as other parameters related to network resource utilization, which may be specified by the wavelength configuration for each virtual link. For example, a minimum availability may be used to filter the potential virtual links. Then, the remaining potential virtual links may be evaluated on network resource utilization associated with the wavelength configuration, such as spectral efficiency, wavelength slot, and physical link equipment, to select a desired potential virtual link.

In some implementations, a cost function may be applied using a metric to weight the wavelength configurations, in order to satisfy some particular goal or priority, as described previously. With or without the cost function, a wavelength configuration may be selected. After selection, the physical links corresponding to the selected virtual link may be configured according to the wavelength configuration of the selected virtual link for optical transport network transmission, as disclosed herein.

Figure 6:
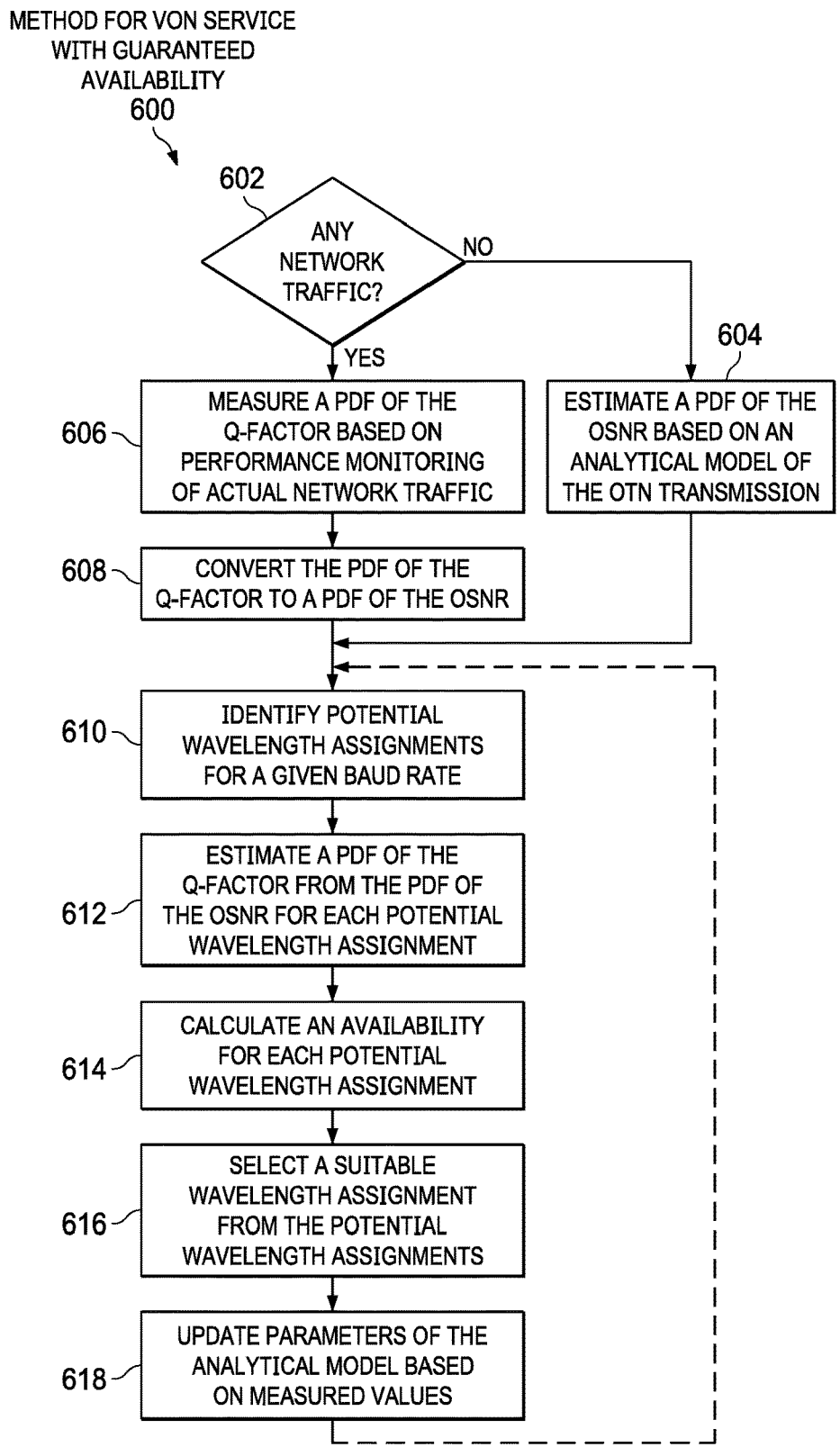
FIG. 6 is a flow chart depicting selected elements of an implementation of a method for virtual optical network service with guaranteed availability.

Referring now to FIG. 6, selected elements of an implementation of method 600 for VON service with guaranteed availability, as described herein, is shown in flow chart format. In various implementations, method 600 may be implemented using optical network 100 and network management system 200 (see FIGS. 1 and 2). It is noted that certain operations depicted in method 600 may be rearranged or omitted, as desired. In particular, method 600 may be performed for a given optical path that is subject to VON mapping as a virtual link.

Method 600 may begin at step 602 with a decision whether any network traffic is transmitted over the optical path. When the result of step 602 is NO and no network traffic is transmitted over the optical path, at step 604, a PDF of the OSNR is estimated based on an analytical model of the OTN transmission. After step 604, method 600 advances to step 610. When the result of step 602 is YES and network traffic is transmitted over the optical path, at step 606, a PDF of the Q-factor is measured based on performance monitoring of actual network traffic. At step 608, the PDF of the Q-factor is converted to a PDF of the OSNR. At step 610, potential wavelength assignments for a given baud rate are identified. At step 612, a PDF of the Q-factor is estimated from the PDF of the OSNR for each potential wavelength assignment. At step 614, an availability for each potential wavelength assignment is calculated. At step 616, a suitable wavelength assignment from the potential wavelength assignments is selected. At step 616, a cost function for a desired metric of the wavelength configuration may be used as a weighting to select a particular wavelength assignment. Step 616 may further comprise implementing the suitable wavelength assignment at the optical path. At step 618, parameters of the analytical model based on measured values is updated. In some implementations, after step 618, method 600 may loop back to step 610, such as when the VON mapping is dynamically updated to reflect evolving network conditions and traffic over the optical path.

As disclosed herein, a method for VON service with guaranteed availability may use probability density functions (PDF) of Q-factor to determine availability of physical links assigned to a virtual link in the VON. Then, a VON mapping may be performed based on the determined availabilities, among other factors.

Referring to FIG. 2, the network provisioning module 250 assigns a modulation format in optical networks, discussed further with respect to FIGS. 7-15.

Figure 7:
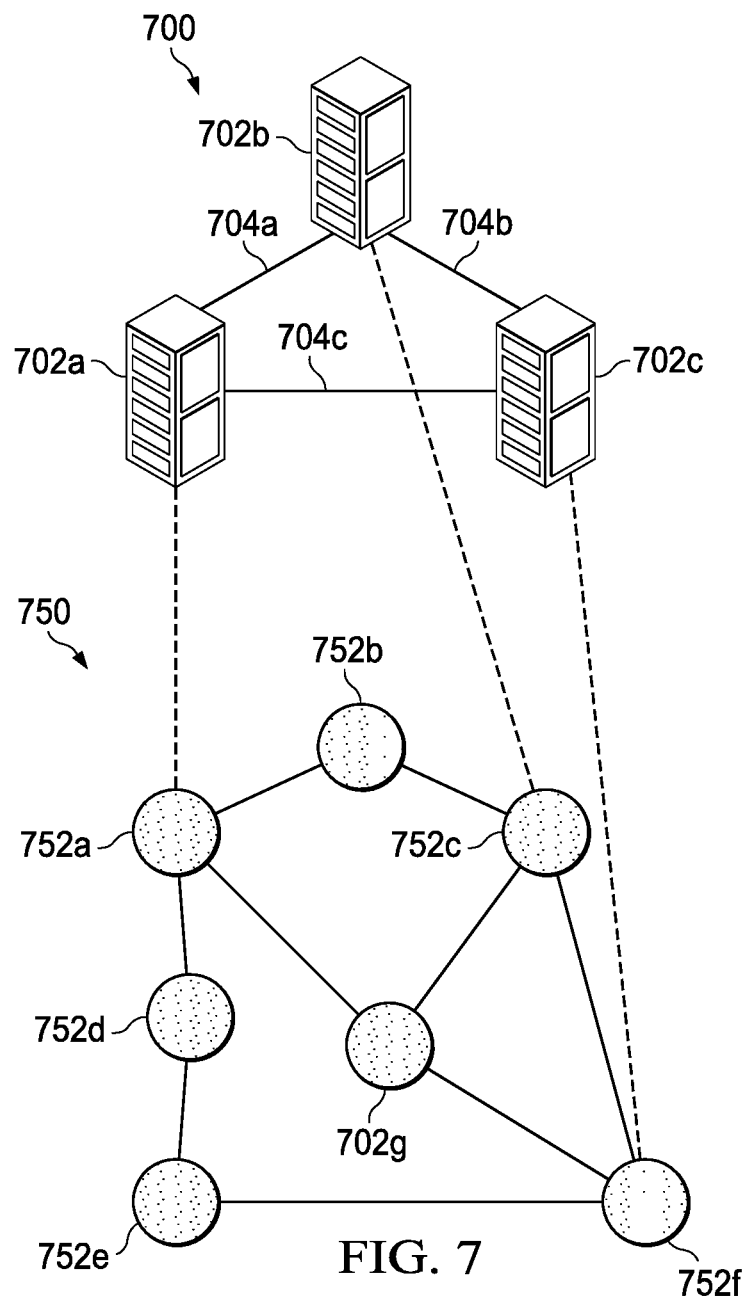
FIG. 7 illustrates an example virtual optical network (VON).

FIG. 7 illustrates an example virtual optical network (VON) 700, similar to the VON 306 of FIG. 3. The VON 700 includes a plurality of virtual nodes 702a, 702b, 702c (collectively referred to as nodes 702). However, the VON 700 can include any number of nodes 702. In some examples, the nodes 702 can map to an optical network 750. For example, the optical network 750 can include physical nodes 752a, 752b, 752c, 752d, 752e, 752f, 752g that are distributed across a geographic region; with node 702a mapped to node 752a, node 702b mapped to node 752c, and node 702c mapped to node 752f.

The VON 700 can include a plurality of optical routes 704a, 704b, 704c (collectively referred as optical routes 704). The optical routes 704 can connect the nodes 702 to one another (pairs of nodes 702). For example, the optical route 704a can connect nodes 702a and 702b; the optical route 704b can connect nodes 702b and 702c; and the optical route 704c can connect nodes 702a and 702c. In some examples, in each pair of nodes 702, one of the nodes 702 can be a source node and the other node 702 can be a destination node (a source-and-destination node pair). In some examples, each of the nodes 702 supports a transponder.

In some implementations, the network provisioning module 250 can identify a desired availability of the optical routes 704. For example, for the pair of nodes 702a, 702b and the optical route 704a between the nodes 702a, 702b, the network provisioning module 250 can identify a desired availability of the optical route 704a. In some examples, the node 702a can be the source node and the node 702b can be the destination node.

In some implementations, the network provisioning module 250 can determine a probability density function (PDF) of a signal-to-noise ratio (SNR) of the signal of the optical route 704a, e.g., an optical signal-to-noise ratio (OSNR). In some examples, the network provisioning module 250 can determine the PDF of the SNR based on existing traffic of the optical route 704a, e.g., calculated by channel performance monitoring and data filtering. However, in some examples, when there is inadequate monitored data based on existing traffic, the network provisioning module 250 can estimate the PDF of the SNR based on a Gaussian-Noise (GN) model (assuming environmental perturbation). For example, the network provisioning module 250 can estimate the PDF of the SNR by a Monte Carlo simulation. In some examples, when there is no existing traffic of the VON 700 and/or the optical route 704a, the network provisioning module 250 can estimate the PDF of the SNR, after transmission of N spans of fiber links, using Equation 10:

$$1/SNR = 1/SNR_o + \sum_{i=1}^{N} (n_i + bP_i^3)/P_i,$$ Equation 10 where $SNR_o$ is the back-to-back SNR, $n_i$ is the amplified spontaneous emission (ASE) noise power at the i-th erbium-doped fiber amplifier (EDFA), b is the nonlinear interference coefficient, and $P_i$ is the launch power at the i-th span.

Figure 8A:
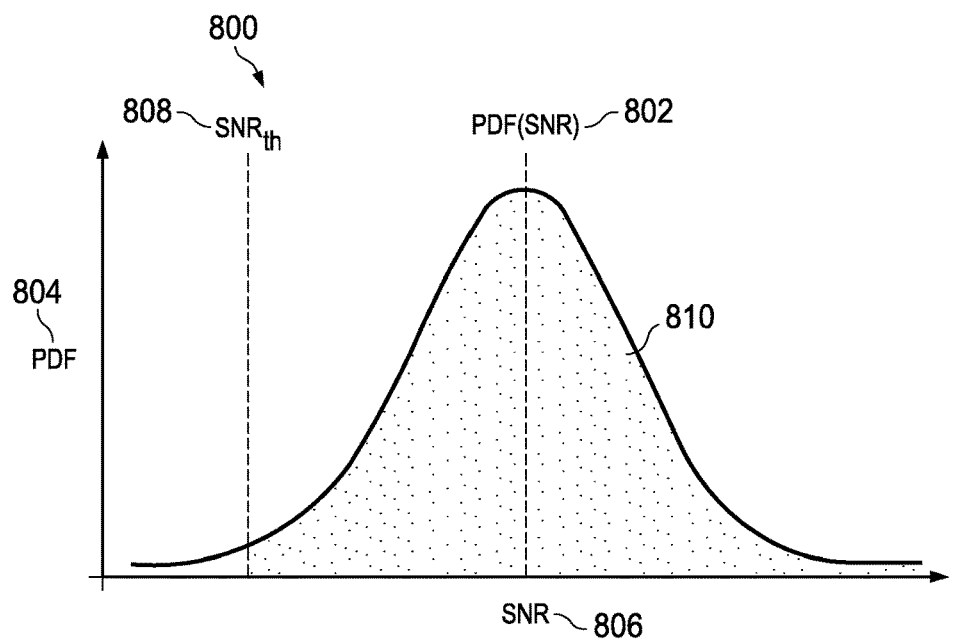
FIGS. 8A, 8B illustrate respective graphs of a PDF of a SNR of a signal of an optical path of the VON.

In some implementations, the network provisioning module 250 determines a SNR threshold such that an integration of the PDF of the SNR of the signal above the SNR threshold corresponds to the desired availability of the optical route 704a. FIG. 8A illustrates a graph 800 of the PDF of the SNR of the signal of the optical path 704a. Specifically, the graph 800 includes the PDF 802 (shown as PDF(SNR)) plotted with PDF along the y-axis 804 and the SNR along the x-axis 806. To that end, the network provisioning module 250 integrates the PDF above the SNR threshold 808, defined as a SNR availability 810. The SNR availability 810 can correspond to the desired availability of the optical route 704a. The networking provisioning module 250 determines the SNR threshold 808 such that the SNR availability 810 corresponds to the desired availability of the optical route 704a.

Figure 8B:
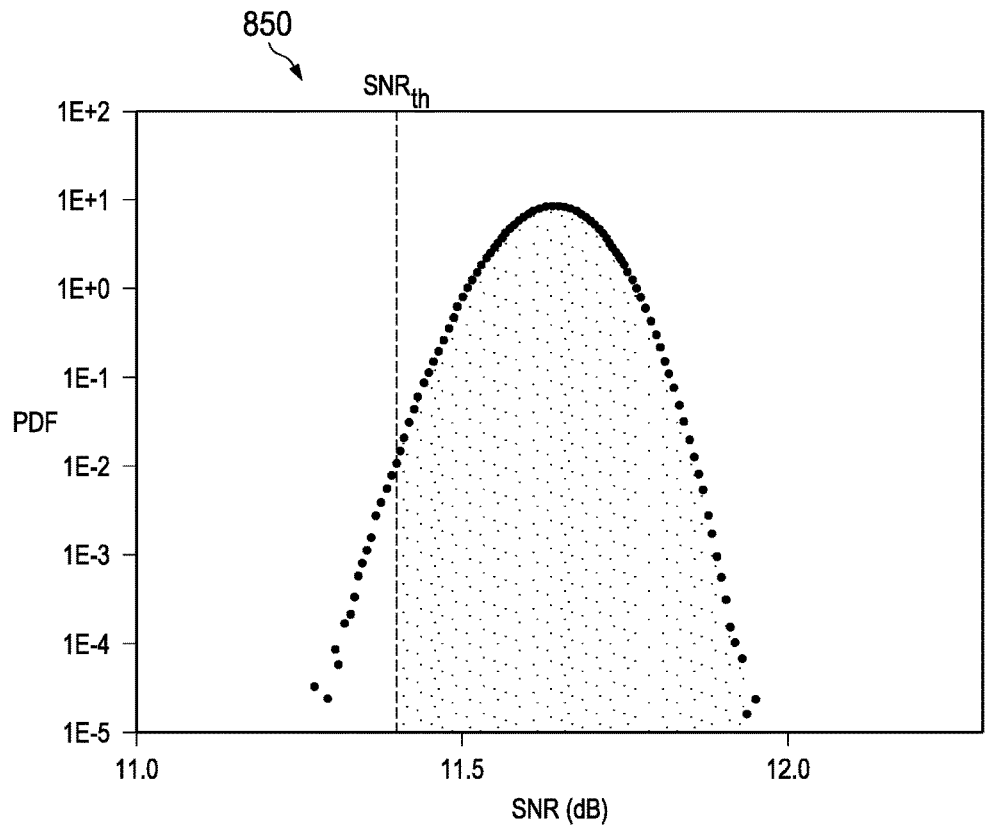

FIG. 8B illustrates a graph 850 of the PDF of the SNR after a 14-span transmission generated by stochastic simulations with 20 million trials, where b is $660/W^2$ assuming 35 Gbaud optical signals in DWDM system with 50 GHz grid and 80 km span length of single-mode optical fiber (SMF). The average launch power is 1 dBm with a standard deviation of 0.7 dB, the average noise figure (NF) is 5.5 dB with a standard deviation of 0.5 dB such that average $n_i$ is about 2.47 μW, and $SNR_o$ is assumed to be 16 dB. The networking provisioning module 250 can determine the SNR threshold ($SNR_{th}$) such that the integration of the PDF above the $SNR_{th}$ corresponds to the required availability.

In some implementations, the network provisioning module 250 determines a plurality of spectral efficiencies that correspond to the SNR threshold 808. That is, each spectral efficiency (SE) of the plurality of spectral efficiencies is associated with a respective modulation format of a plurality of modulation formats. Specifically, each modulation format (MF) can be associated with a particular spectral efficiency (or mutual information) for the corresponding SNR, e.g., the SNR threshold 808. In other words, the spectral efficiency, for a particular MF, is known for a corresponding SNR. In some examples, a transponder can support the modulation formats, e.g., a transponder of the VON 700.

Figure 9:
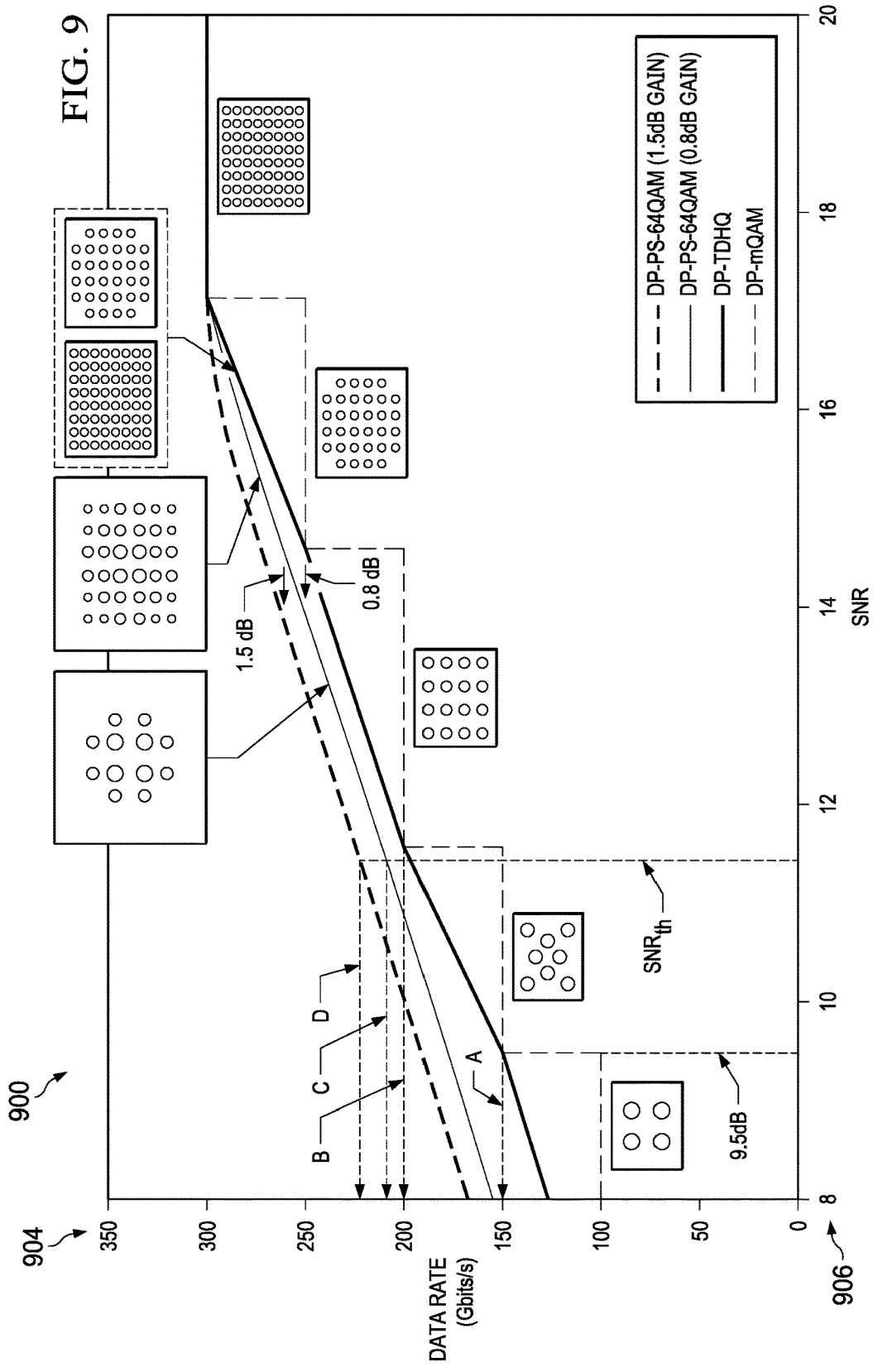
FIG. 9 illustrates a graph displaying a plurality of spectral efficiencies that correspond to a SNR threshold.

For example, FIG. 9 illustrates a graph 900 displaying a plurality of spectral efficiencies that correspond to the SNR threshold 808. Specifically, the SNR threshold 808 is plotted against the spectral efficiencies (shown as data rate of Gbits/s) with the SE along the y-axis 904 and the SNR along the x-axis 906. To that end, the network provisioning module 250 determines each of the spectral efficiencies that correspond to the SNR threshold 808, with each of the spectral efficiencies associated with a respective modulation format.

For example, the graph 900 illustrates SNR versus error free net data rate when the signal of the optical path 704a is a 35 gigabaud (Gbd) signal for a plurality of modulation formats. It is assumed that DP-16QAM with a uniform distribution carries 200 gigabits/second (Gb/s) net data rate with a Q-factor threshold of 5.23 dB, or BER threshold of $3.4e^{-2}$. The network provisioning module 250 calculates the SNR versus error free data rate of a first modulation format, DP-mQAM (m=4, 8, 16, 32 and 64) using the same BER threshold. A second modulation format, DP-TDHQ, provides nearly continuous fine tunability of the data rate by time interleaving two different mQAMs with appropriate ratio and the optimal data rate. Alternatively, probabilistic shaping (PS) can provide fine tunability with an improved capacity for a given SNR compared to DP-TDHQ by controlling shaping factor. The optimal shaping factor for a given SNR can be found based on the Maxwell-Boltzmann distribution. The ideal SNR gain for a given data rate is approximately 1.5 dB, shown as the third modulation format DP-64QAM. The data rate of DP-PS-64QAM approaches that of DP-64QAM at higher SNR as the shaping factor at higher SNR approaches that of uniform distribution. The fourth modulation factor, DP-PS-64QAM, assumes a 0.8 dB SNR gain with respect to DP-mQAM, which includes implementation penalty of PS and FEC encoding.

In some implementations, the network provisioning module 250 identifies a particular modulation format of the plurality of modulation formats that corresponds to a maximum spectral efficiency of the plurality of spectral efficiencies. Specifically, the network provisioning module 250 selects the modulation format that maximizes the (error free) SE for the threshold SNR 808. That is, the network provisioning module 250 selects the modulation format that corresponds to the maximum SE without error after FEC decoding.

For example, referring to FIG. 9 again, for an availability of 0.9999 of the optical route 704a, the network provisioning module 250 determines that the SNR threshold 808 is 11.4 dB. For the first modulation format, DP-mQAM (m=8), the network provisioning module 250 determines the spectral efficiency (data rate) to be 150 Gb/s, shown as a. Specifically, the availability of DP-8QAM can be larger than 0.9999 as the error free SNR threshold of DP-8QAM is approximately 9.5 dB, which is smaller than the SNR threshold 208. However, this additional margin (1.9 dB=11.4 dB−9.5 dB) cannot be utilized to transmit more data due to the discrete nature of the modulation format based on DP-mQAM. For the second modulation format, DP-TDHQ, the network provisioning module 250 determines that the SE is 195 Gb/s, shown as b. For the third modulation format, 1.5 dB gain by DP-PS-64QAM, the network provisioning module 250 determines that the SE is 221.8 Gb/s, shown as d. For the fourth modulation format, 0.8 dB gain by DP-PS-64QAM, the network provisioning module 250 determines that the SE is 209.1 Gb/s, shown as c. Furthermore, the selected MF can enable continuous data rate tuning to facilitate allocation of data without excess SNR margin or excess availability.

To that end, the network provisioning module 250 selects the modulation format that corresponds to the maximum SE for the SNR threshold 808. In the illustrated example, if a transponder supports ideal probabilistic shaping, the network provisioning module 250 selects the third modulation format, 1.5 dB gain by DP-PS-64QAM, as this modulation format is associated with the maximum SE, e.g., a data rate of 221.8 Gb/s. However, if a transponder supports probabilistic shaping with implementation penalty, then the network provisioning module 250 selects the second modulation format, 0.8 dB gain by DP-PS-64QAM over regular mQAM. If a transponder only supports discrete modulation format, such as DP-mQAM, then the chosen modulation format will be DP-8QAM with 150 Gb/s.

In some examples, identifying the particular modulation format can include, identifying, by the network provisioning module 250, parameters of the particular modulation format. For example, the parameters can include probabilistic shaping (PS) parameters or time-domain hybrid quadrature amplitude modulation (TDHQ) parameters.

In some examples, the network provisioning module 250 assigns the particular modulation format to the virtual optical network 700. Specifically, the network provisioning module 250 can assign the particular modulation format to the optical network 704a. Continuing the example, the networking provisioning module 250 can assign the third modulation format, 1.5 dB gain by DP-PS-64QAM, to the optical route 704a and/or the VON 700. In some examples, the 1.5 dB can be subjected to penalty in implementation.

Figure 10:
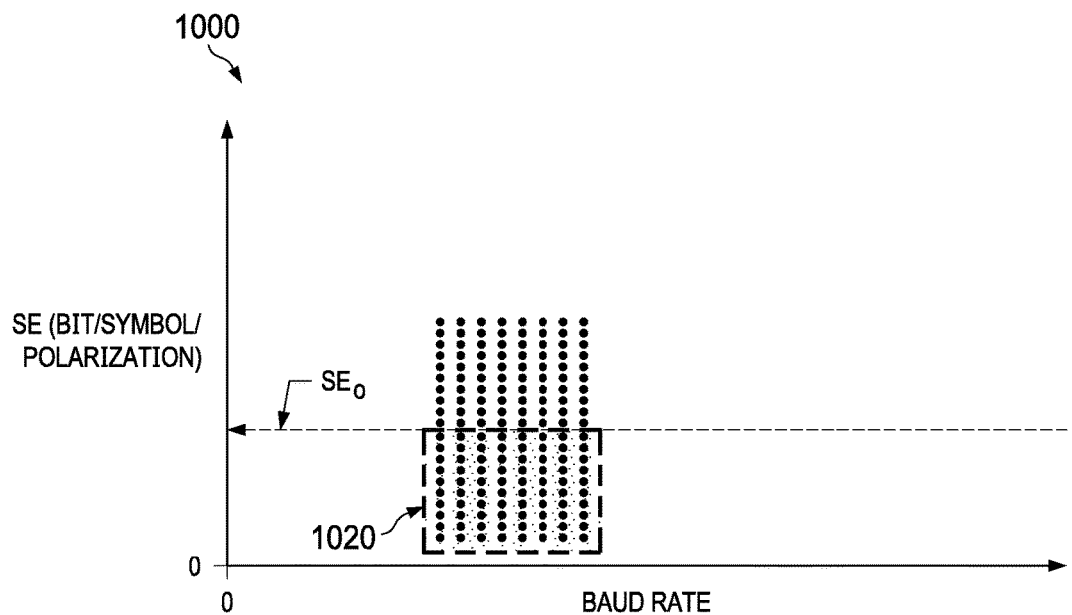
FIG. 10 illustrates a graph displaying a baud rate as a function of the spectral efficiency.

In some examples, the network provisioning module 250 can determine a baud rate that is based on the maximum spectral efficiency. FIG. 10 illustrates a graph 1000 illustrating baud rate as a function of the SE per polarization. For example, the transponders of the VON 700 can support a flexible baud rate. To that end, the network provisioning module 250 can determine the baud rate, for the maximum SE per polarization, as:

baud rate=data rate/2 *SE* (for a dual polarization signal). Equation 11

For example, for a maximum SE per polarization found based on FIG. 9 for a given SNR, shown as $SE_0$, the network provisioning module 250 can identify any of the possible baud rates and spectral efficiency 1020 where the supported baud rates and spectral efficiencies in a transponder are marked with dots are marked as an example. On FIG. 10, the data rate corresponding to each dot will be twice of multiplication of baud rate and spectral efficiency.

In some examples, the network provisioning module 250 can determine an additional modulation format based on an additional desired availability of the optical route 704a. For example, referring to FIG. 11, additional SNR margin 1102 can be added, shown as $SNR_{margin}$. In turn, the expected availability will be increased, where an additional SNR threshold 1104, shown as $SNR'_{th}$ is used to determine, by the network provisioning module 250, the appropriate SE and MF. In some examples, the additional SNR threshold 1104 is the difference between the SNR threshold 808 and the additional SNR margin 1102.

Figure 11:
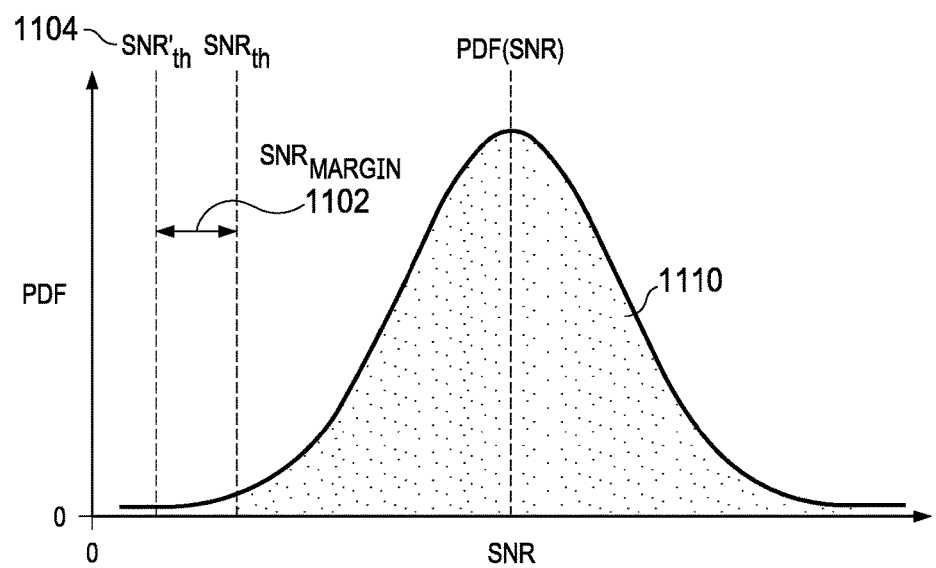
FIG. 11 illustrates a graph showing an additional SNR margin.
Figure 12:
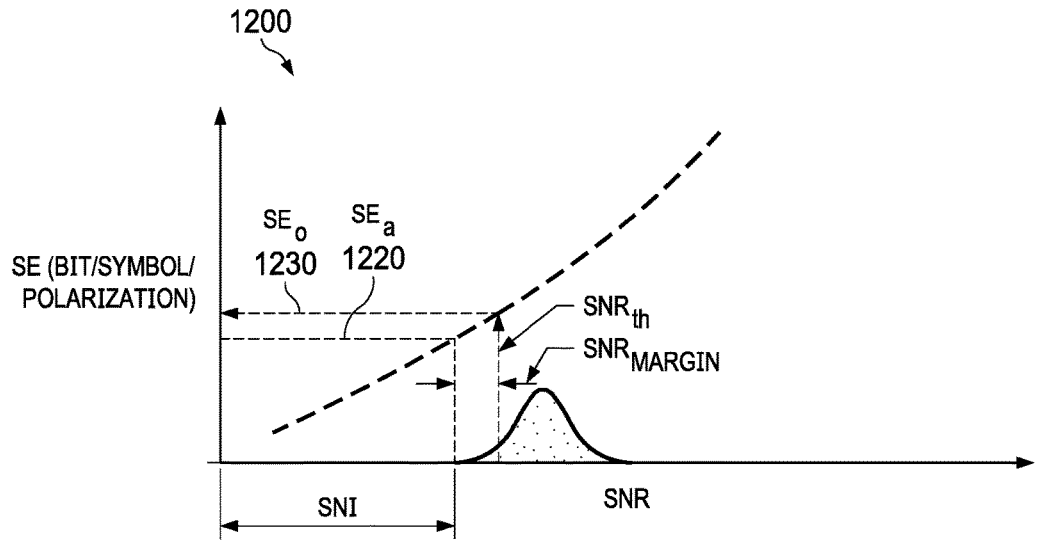
FIG. 12 illustrates a graph displaying a spectral efficiency that corresponds to an additional SNR threshold.

Specifically, the network provisioning module 250 can identify an additional desired availability of the optical route 704a. The network provisioning module 250 determines the additional SNR threshold 1104 such that an integration of the PDF of the SNR of the signal above the additional SNR threshold 1104 corresponds to the additional desired availability of the optical route 704a. Referring to FIG. 11, the network provisioning module 250 integrates the PDF above the additional SNR threshold 1104, defined as additional SNR availability 1110. The additional SNR availability 1110 can correspond to the additional desired availability of the optical route 704a. The network provisioning module 250 determines an additional plurality of spectral efficiencies that correspond to the additional SNR threshold 1104. That is, each spectral efficiency (SE) of the plurality of additional spectral efficiencies is associated with a respective modulation format of a plurality of modulation formats. Specifically, each modulation format (MF) can be associated with a particular additional spectral efficiency (or mutual information) for the corresponding SNR, e.g., the additional SNR threshold 1104. The network provisioning module 250 identifies a particular additional modulation format of the plurality of modulation formats that corresponds to a maximum additional spectral efficiency of the plurality of additional spectral efficiencies. Specifically, the network provisioning module 250 selects the modulation format that maximizes the (error free) SE for the additional SNR threshold 1104. For example, FIG. 12 illustrates a graph 1200 displaying a SE that corresponds to the additional SNR threshold 1104 for the particular additional modulation format, shown as $SE_a$ 1220.

In some examples, the integration, by the network provisioning module 250, of the PDF of the SNR of the signal above the additional SNR threshold 1104 is greater than the integration of the PDF of the SNR of the signal above the SNR threshold 808. That is, the additional SNR availability 1110 is greater than the SNR availability 810. Further, the maximum additional spectral efficiency that corresponds to the particular additional modulation format is less than the maximum spectral efficiency that corresponds to the particular modulation format. For example, referring to FIG. 12, the maximum spectral efficiency is shown as $SE_0$ 1230 that corresponds to the particular modulation format and the SNR threshold 808; and the additional maximum spectral efficiency is shown as $SE_a$ 1220 that corresponds to the particular modulation format and the additional SNR threshold 1104. To that end, $SE_a$ 1220 is less than $SE_0$ 1230.

In some examples, a second, or backup, optical route can be provided between the optical nodes 702. The second optical route can be associated with the desired availability of the optical route 704a, or a differing desired availability. In some examples, the second optical route can include an additional node positioned between the connected nodes.

The network provisioning module 250 can determine a second probability density function (PDF) of the signal-to-noise ratio (SNR) of the signal of the second optical route. The network provisioning module 250 determines a second SNR threshold such that an integration of the PDF of the SNR of the signal above the second SNR threshold corresponds to the desired availability of the second optical route.

The network provisioning module 250 determines a second plurality of spectral efficiencies that correspond to the second SNR threshold. That is, each spectral efficiency (SE) of the second plurality of spectral efficiencies is associated with a respective second modulation format of the plurality of modulation formats. The network provisioning module 250 identifies a particular second modulation format of the plurality of modulation formats that corresponds to a second maximum spectral efficiency of the plurality of second spectral efficiencies. Specifically, the network provisioning module 250 selects the modulation format that maximizes the (error free) SE for the second threshold SNR.

Figure 13:
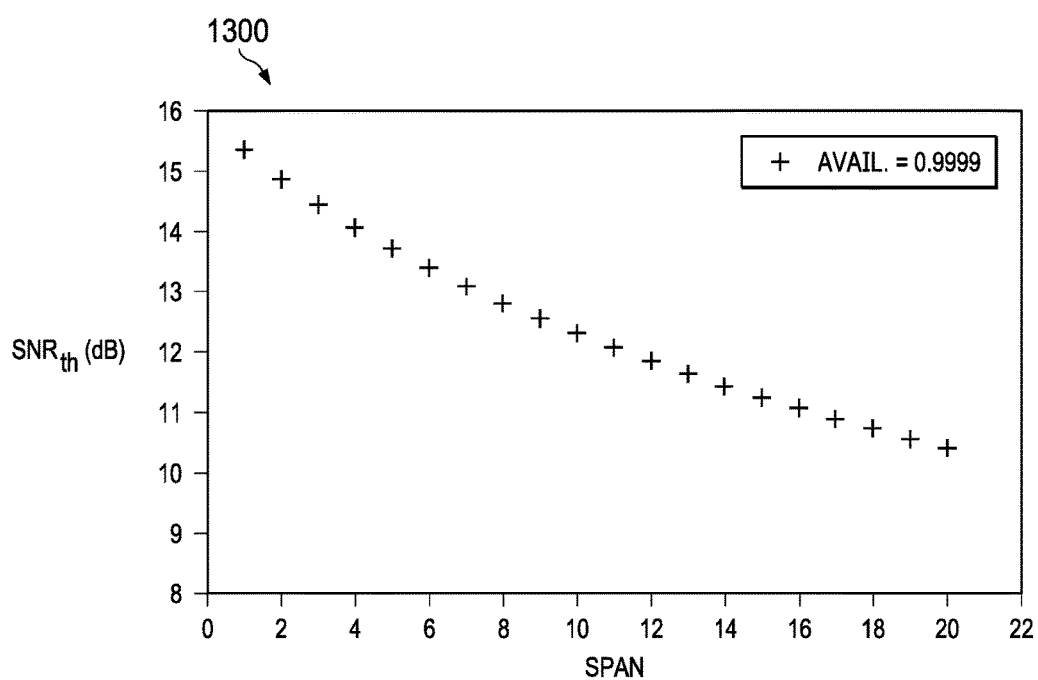
FIG. 13 illustrates a graph showing a threshold SNR versus number of spans to be transmitted over.

FIG. 13 illustrates a graph 1300 showing that the SNR threshold (e.g., SNR threshold 808) can depend on the number of spans to be transmitted over. Specifically, as the number of spans increases, the SNR threshold decreases. Thus, the maximum data rate of the particular modulation format decreases as the number of span increases.

Figure 14:
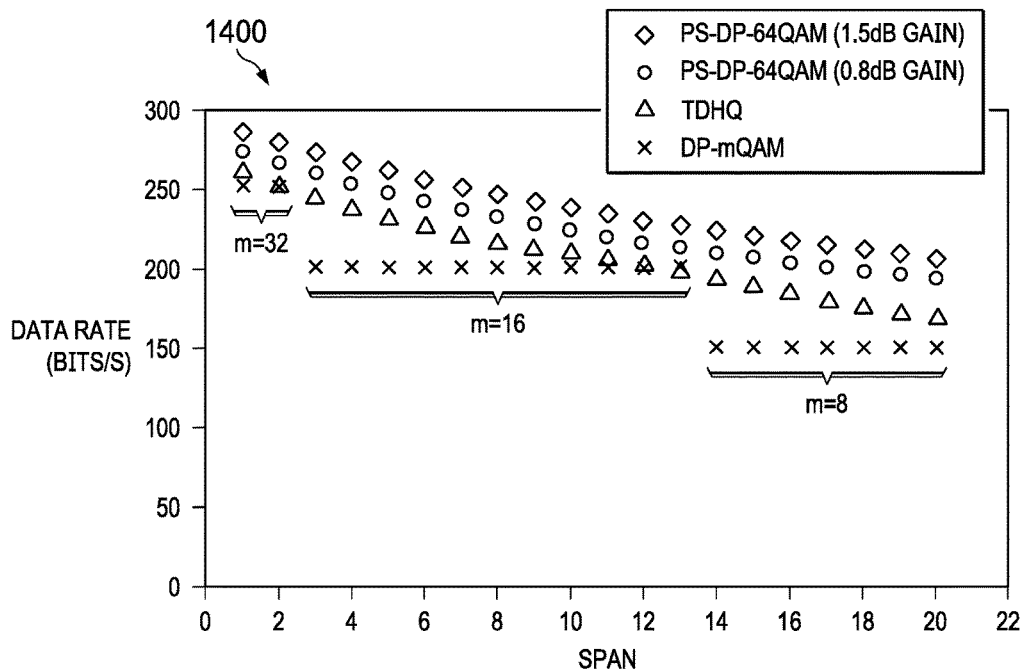
FIG. 14 illustrates a graph showing the optimal data rate that meets the desired availability versus transmitted span for each supported modulation format.

FIG. 14 illustrates a graph 1400 showing the optimal data rate that meets the desired availability versus transmitted span for each supported modulation format. To that end, the data rate based on the modulation format of DP-mQAM is a stair-like profile depending on the transmission span numbers due to the discrete nature of data rate supported by DP-mQAM. The data rate based on the modulation format DP-TDHQ shows gradual decrease as the span number increases. The gap of data rate between DP-mQAM and DP-TDHQ is not constant. For example, the difference is approximately 58 Gb/s for 3-span transmission but the difference is almost negligible for a 2-span transmission. Thus, the availability of DP-16QAM for a 3-span transmission is larger than the desired availability with excessive SNR margin as described herein, while the SNR margin for a 2-span transmission is negligible. Finally, the data rate based on the modulation format DP-PS-64QAM can be further improved compared to DP-TDHQ due to the shaping gain. The capacity gain by DP-PS64QAM (practical 0.8 dB SNR gain over DP-mQAM) over DP-TDHQ is between 5% and 14% for transmission spans between 1 and 20. This gain is between approximately 6% and 47% depending on the transmission span compared to discrete DP-mQAM.

Figure 15:
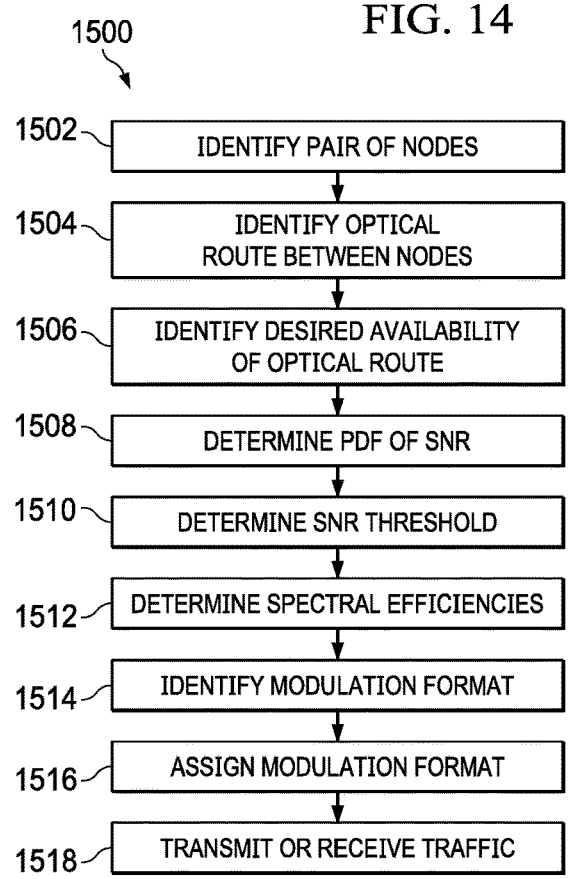
FIG. 15 illustrates a flowchart for assigning a modulation format in optical networks.

FIG. 15 illustrates a flowchart depicting selected elements of an embodiment of a method 1500 for assigning a modulation format in optical networks. The method 1500 may be performed by the network management system 200 described herein with reference to FIGS. 1-14. It is noted that certain operations described in method 1500 may be optional or may be rearranged in different embodiments.

The network provisioning module 250 identifies a pair of nodes 702a, 702b of the VON 700 (1502). The network provisioning module 250 identifies the optical route 704a between the nodes 702a, 702b (1504). Further, the network provision module 250 identifies the desired availability of the optical route 704a (1506). For example, the availability of the optical route 704a can be defined as a fraction of a time duration, within a given time period, in which a quality of a signal of the optical route 704a provided by the source node 702a is such that the signal is able to be recovered by the destination node 702b (i.e., recovery of the data of the signal). The network provisioning module 250 can determine the probability density function (PDF) of the signal-to-noise ratio (SNR) of the signal of the optical route 704a (1508). In some examples, the network provisioning module 250 can determine the PDF of the SNR based on existing traffic of the optical route 704a, e.g., calculated by channel performance monitoring and data fitting. In some examples, the network provisioning module 250 can estimate the PDF of the SNR based on an analytic model such as Gaussian-Noise (GN) model (assuming environmental perturbation).

In some implementations, the network provisioning module 250 determines the SNR threshold 808 such that the integration of the PDF of the SNR of the signal above the SNR threshold 808 corresponds to the desired availability of the optical route 704a (1510). In some examples, the network provisioning module 250 integrates the PDF above the SNR threshold 808, defined as SNR availability 810. The SNR availability 810 can correspond to the desired availability of the optical route 704a. The networking provisioning module 250 determines the SNR threshold 808 such that the SNR availability 810 corresponds to the desired availability of the optical route 704a. The network provisioning module 250 determines a plurality of spectral efficiencies that correspond to the SNR threshold (1512). For example, the network provisioning module 250 determines each of the spectral efficiencies that correspond to the SNR threshold 808, with each of the spectral efficiencies associated with a respective modulation format. The network provisioning module 250 identifies a particular modulation format of the plurality of modulation formats that corresponds to a maximum spectral efficiency of the plurality of spectral efficiencies (1514). Specifically, the network provisioning module 250 selects the modulation format that maximizes the (error free) SE for the threshold SNR 808. The network provisioning module 250 assigns the particular modulation format to the VON 700 (1516). Traffic is transmitted or received over the VON 700 using the particular modulation format (1518).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method for assigning a modulation format in optical networks, the method comprising:
   identifying a pair of nodes of a plurality of nodes of a virtual optical network (VON);
   identifying an optical route between the pair of nodes;
   determining a desired availability of the optical route;
   determining a probability density function (PDF) of a signal-to-noise ratio (SNR) of a signal of the optical route;
   determining a SNR threshold such that an integration of the PDF of the SNR of the signal above the SNR threshold corresponds to the desired availability of the optical route;
   determining a plurality of spectral efficiencies that corresponds to the SNR threshold, each spectral efficiency of the plurality of spectral efficiencies associated with a respective modulation format of a plurality of modulation formats;
   identifying a particular modulation format of the plurality of modulation formats that corresponds to a maximum spectral efficiency of the plurality of spectral efficiencies;
   assigning the particular modulation format to the virtual optical network; and
   transmitting or receiving traffic over the virtual optical network using the particular modulation format.

2. The method of claim 1, wherein identifying the particular modulation format includes identifying parameters of the particular modulation format.

3. The method of claim 2, wherein the parameters include probabilistic shaping (PS) parameters or time-domain hybrid quadrature amplitude modulation (TDHQ) parameters.

4. The method of claim 1, further comprising determining a baud rate based on the maximum spectral efficiency.

5. The method of claim 1, further comprising:
   calculating an additional desired availability of the optical route;
   determining an additional SNR threshold such than an integration of the PDF of the SNR of the signal above the additional SNR threshold corresponds to the additional desired availability of the optical route;
   determining an additional plurality of spectral efficiencies that corresponds to the additional SNR threshold, each additional spectral efficiency of the plurality of additional spectral efficiencies associated with a respective additional modulation format of the plurality of modulation formats; and
   identifying a particular additional modulation format of the plurality of modulation formats that corresponds to a maximum additional spectral efficiency of the plurality of additional spectral efficiencies.

6. The method of claim 5, wherein the integration of the PDF of the SNR of the signal above the additional SNR threshold is greater than the integration of the PDF of the SNR of the signal above the SNR threshold.

7. The method of claim 6, wherein the maximum additional spectral efficiency that corresponds to the particular additional modulation format is less than the maximum spectral efficiency that corresponds to the particular modulation format.

8. The method of claim 1, further comprising:
   identifying a second optical route between the pair of nodes, wherein the second optical route is associated with the desired availability;
   determining a second probability density function (PDF) of the signal-to-noise ratio (SNR) of the signal of the second optical route;
   determining a second SNR threshold such that an integration of the PDF of the SNR of the signal above the second SNR threshold corresponds to the desired availability of the second optical route;
   determining a second plurality of spectral efficiencies that corresponds to the second SNR threshold, each second spectral efficiency of the plurality of second spectral efficiencies associated with a respective second modulation format of the plurality of modulation formats; and
   identifying a particular second modulation format of the plurality of modulation formats that corresponds to a second maximum spectral efficiency of the plurality of second spectral efficiencies.

9. A system for assigning a modulation format in optical networks, the system comprising a processor having access to memory media storing instructions executable by the processor to:
   identifying a pair of nodes of a plurality of nodes of a virtual optical network (VON);
   identifying an optical route between the pair of nodes;
   determining a desired availability of the optical route;
   determining a probability density function (PDF) of a signal-to-noise ratio (SNR) of a signal of the optical route;
   determining a SNR threshold such that an integration of the PDF of the SNR of the signal above the SNR threshold corresponds to the desired availability of the optical route;
   determining a plurality of spectral efficiencies that corresponds to the SNR threshold, each spectral efficiency of the plurality of spectral efficiencies associated with a respective modulation format of a plurality of modulation formats;
   identifying a particular modulation format of the plurality of modulation formats that corresponds to a maximum spectral efficiency of the plurality of spectral efficiencies;
   assigning the particular modulation format to the virtual optical network; and
   transmitting or receiving traffic over the virtual optical network using the particular modulation format.

10. The system of claim 9, wherein identifying the particular modulation format includes identifying parameters of the particular modulation format.

11. The system of claim 10, wherein the parameters include probabilistic shaping (PS) parameters or time-domain hybrid quadrature amplitude modulation (TDHQ) parameters.

12. The system of claim 9, the instructions further comprising determining a baud rate based on the maximum spectral efficiency.

13. The system of claim 9, the instructions further comprising:
   determining an additional desired availability of the optical route;
   determining an additional SNR threshold such than an integration of the PDF of the SNR of the signal above the additional SNR threshold corresponds to the additional desired availability of the optical route;

determining an additional plurality of spectral efficiencies that corresponds to the additional SNR threshold, each additional spectral efficiency of the plurality of additional spectral efficiencies associated with a respective additional modulation format of the plurality of modulation formats; and identifying a particular additional modulation format of the plurality of modulation formats that corresponds to a maximum additional spectral efficiency of the plurality of additional spectral efficiencies.

14. The system of claim 13, wherein the integration of the PDF of the SNR of the signal above the additional SNR threshold is greater than the integration of the PDF of the SNR of the signal above the SNR threshold.

15. The system of claim 14, wherein the maximum additional spectral efficiency that corresponds to the particular additional modulation format is less than the maximum spectral efficiency that corresponds to the particular modulation format.

16. The system of claim 9, the instructions further comprising:

identifying a second optical route between the pair of nodes, wherein the second optical route is associated with the desired availability;

determining a second probability density function (PDF) of the signal-to-noise ratio (SNR) of the signal of the second optical route;

determining a second SNR threshold such that an integration of the PDF of the SNR of the signal above the second SNR threshold corresponds to the desired availability of the second optical route;

determining a second plurality of spectral efficiencies that corresponds to the second SNR threshold, each second spectral efficiency of the plurality of second spectral efficiencies associated with a respective second modulation format of the plurality of modulation formats; and identifying a particular second modulation format of the plurality of modulation formats that corresponds to a second maximum spectral efficiency of the plurality of second spectral efficiencies.

* * * * *